United States Patent [19]

Matsuda

[11] Patent Number: 5,170,343
[45] Date of Patent: Dec. 8, 1992

[54] FAIL-SAFE SYSTEM FOR MULTIPLE CONTROL SYSTEMS HAVING AT LEAST ONE COMMON SENSOR FOR MONITORING COMMON CONTROL PARAMETER

[75] Inventor: Toshiro Matsuda, Kanagawa, Japan

[73] Assignee: Nissan Montor Company, Limited, Yokohama, Japan

[21] Appl. No.: 521,974

[22] Filed: May 10, 1990

[30] Foreign Application Priority Data

May 11, 1989 [JP] Japan .................................. 1-118319

[51] Int. Cl.⁵ .......................................... G06F 15/46
[52] U.S. Cl. ................................. 364/184; 364/426.02
[58] Field of Search ................. 364/184, 185, 426.01, 364/426.02; 303/92, 95; 180/197

[56] References Cited

U.S. PATENT DOCUMENTS 4,701,854 10/1987 Matsuda ......................... 364/426.02
5,014,809  5/1991 Matsuda .............................. 180/248

Primary Examiner—Jerry Smith
Assistant Examiner—Paul Gordon
Attorney, Agent, or Firm—Foley & Lardner

[57] ABSTRACT

A fail-safe system for a multiple task control system which has a plurality of control channels for performing mutually independent and mutually distinct control functions detects failure in one of the control channels. In response, the fail-safe system discriminates between a failure which occurs at a common sensor which is commonly utilized for more than one control channels or a common control channel which are commonly used for more than one control channels, and a failure at other sensors for monitoring parameters to be used for a singular control channel or individual control channel for single control function. The fail-safe system performs mutually distinct modes of fail-safe operation depending upon the result of the discrimination.

27 Claims, 19 Drawing Sheets

FAIL-SAFE SYSTEM FOR MULTIPLE CONTROL SYSTEMS HAVING AT LEAST ONE COMMON SENSOR FOR MONITORING COMMON CONTROL PARAMETER

BACKGROUND OF THE INVENTION

1. Field of the Invention

The present invention relates generally to a multiple task control system for an automotive vehicle, which performs a plurality of mutually independent controls, such as traction control, anti-skid brake control, suspension control and so forth, employing at least one control parameter common to the other. More specifically, the invention relates to a fail-safe system for such multiple task control system.

2. Description of the Background Art

In automotive technologies, various electronic control systems have been developed for enhancement of vehicular drivability, driving stability, safety, riding comfort and so forth. For performing various controls, it is not practical to provide a plurality of microprocessors for independent operations to each other in view of cost and strictly limited space for installation. Therefore, it is practical to combine more than one control function to perform on a single microprocessor. For example, Japanese Patent First (unexamined) Publication (Tokkai) Showa 61-169211 discloses a multiple task control system performing an anti-skid brake control and a driving power or torque distribution control for four-wheel drive vehicle. The disclosed control system controls anti-skid actuator which adjusts braking pressure in a wheel cylinder. Also, the disclosed control system controls a torque distribution control clutch for adjusting driving torque distribution between primary and subsidiary driving wheels. The control system employs a wheel speed sensor for monitoring rotation speed of a road wheel as a common sensor for providing control parameter data for both of the anti-skid control and the driving torque distribution control.

For such control system, fail-safe functions are provided for undertaking respectively associated control when failure is caused in associated one of control functions. Typically, individual fail-safe functions are provided for respective control functions for independent operation to each other. In such case, action of the fail-safe function for one control function can interfere or affect the other control function.

SUMMARY OF THE INVENTION

Therefore, it is an object of the present invention to provide a fail-safe system for a multiple task control system which can perform an independent fail-safe function without causing mutual interference with other control functions.

In order to accomplish aforementioned and other objects, a fail-safe system for a multiple task control system which has a plurality of control channels for performing mutually independent and mutually distinct control functions, according to the present invention, detects failure in one of the control channels. In response, the fail-safe system determines whether failure occurs at a common sensor which is commonly utilized for more than one control channels or a common control channel which are commonly used for more than one control channels, and other sensors for monitoring parameters to be used for a singular control channel or individual control channel for single control function. The fail-safe system performs mutually distinct modes of fail-safe operation depending upon the result of discrimination.

According to one aspect of the invention, a fail-safe system for a multiple task control system for performing mutually different first and second control tasks, the control system performing the first control task on the basis of a first parameter monitored by a first monitoring means and a second parameter monitored by a second monitoring means and the second control task on the basis of the first parameter common to the first task and a third parameter monitored by a third monitoring means, the fail-safe system comprises:

first fail detecting means for monitoring operation of the first monitoring means for detecting faulty condition of to produce a first failure detecting signal which is indicative of failure of both of first and second control tasks;

second fail detecting means for monitoring the second and third monitoring means for detecting faulty condition of one of the second and third monitoring means for producing a second failure detecting signal which indicates failure of one of the second and third monitoring means on which failure is detected;

controlling means for normally performing the first and second control tasks independent of each other on the basis of the first, second and third parameters, the controlling means being responsive to the first failure detecting signal to perform a first mode fail-safe operations in both of first and second control operations for performing the first and second tasks, and to the second failure detecting signal to perform second mode fail-safe operation in one of the first and second control operations utilizing the faulty one of the second and third element as indicated by the second failure indicative signal.

In the preferred construction, the second fail detecting means may include a first detector associated with the second monitoring means for continuously monitoring output thereof for detecting abnormality for producing a first abnormality detecting signal indicative of failure of the second monitoring means, and a second detector continuously monitoring output thereof for detecting abnormality for producing a second abnormality detecting signal indicative of failure of the third monitoring means. Furthermore, the multiple task control system may include a first control channel including a first actuator for performing the first control task and a second control channel including a second actuator for performing the second control task, and the second fail detecting means includes a third detector constantly monitoring control command to be applied to the first actuator and operation of the first actuator in response to detect abnormality of the actuator operation in terms of the applied control command to produce a third abnormality detecting signal indicative of failure of the first actuator, and a second actuator for performing the second control task and a second control channel including a second actuator for performing the second control task, and the second fail detecting means includes a third detector constantly monitoring control command to be applied to the second actuator and operation of the second actuator in response to detect abnormality of the actuator operation in terms of the applied control command to produce a fourth abnormality detecting signal indicative of failure of the second actuator. The controlling means may be responsive to the second failure detecting signal of the second monitoring means for shutting off power supply for one of the first and second actuator in one of the first and second control channels in which failure of the monitoring means or the actuator is detected. Preferably, the first and second actuators are responsive to shutting down of power supply to be placed at predetermined operational positions.

The fail-safe system may further comprise a first alarm to be triggered in response to the first failure detecting signal for alarming the first mode fail-safe operation commonly to the first and second control channels and a second alarm to be triggered in response to the second failure detecting signal for alarming the second mode fail-safe operation to one of the first and second control channels in which failure of the monitoring means or the actuator is detected. In such case, the controlling means may be responsive to the first fail detecting signal to take place the first mode fail-safe operation for the second means, in which the control command to be applied to the second actuator in the second control channel, is modified periodically by a given rate toward a predetermined value for a predetermined position of the second actuator.

According to another aspect of the invention, a mult-task control system comprises:

a first control channel for controlling operation of a first control load, the first control channel including a first monitoring means for monitoring a first control parameter for providing a first parameter data and a second monitoring means for monitoring a second control parameter different from the first control parameter, for providing a second parameter data, and the first control channel further including a first signal processing means for processing the first and second control parameter data for deriving a first command value indicative of operational magnitude of the first control load;

a second control channel for controlling operation of a second control load, the second control channel including a first monitoring means which is common to the first control channel and a third monitoring means for monitoring a third control parameter different from the first control parameter, for providing a third parameter data, and the second control channel further including a second signal processing means for processing the first and third control parameter data for deriving a second command value indicative of operational magnitude of the second control load;

first fail detecting means monitoring the first parameter data output from the first monitoring means in order to detect abnormality of the first parameter data value to producing a first fail detecting signal;

second fail detecting means monitoring the second parameter data output from the second monitoring means in order to detect abnormality of the second parameter data value to producing a second fail detecting signal;

third fail detecting means monitoring the third parameter data output from the third monitoring means in order to detect abnormality of the third parameter data value to producing a third fail detecting signal;

first fail-safe means responsive to the first fail detecting signal for performing first mode fail-safe operation, in which fail-safe operation is commonly commanded for both of the first and second control channels for predetermined first mode fail-safe operations in each of the first and second control channels; and second fail-safe means responsive to one of the second and third fail detecting signals, for performing second mode fail-safe operation, in which fail-safe operation is selectively commanded to one of the first and second control channel corresponding to input fail detecting signal for a predetermined second mode fail-safe operation therein.

According to a further aspect of the invention, a multi-task control system for an automotive vehicle for controlling a first vehicular component associated with vehicular driving operation for adjusting first vehicular befavior and a second vehicular component associated with vehicular driving operation for adjusting second vehicular befavior, comprises:

a first control channel for controlling operation of a first vehicular component, the first control channel including a first monitoring means for monitoring a first control parameter for providing a first parameter data and a second monitoring means for monitoring a second control parameter different from the first control parameter, for providing a second parameter data, and the first control channel further including a first signal processing means for processing the first and second control parameter data for deriving a first command value indicative of operational magnitude of the first vehicular component;

a second control channel for controlling operation of a second vehicular component, the second control channel including a first monitoring means which is common to the first control channel and a third monitoring means for monitoring a third control parameter different from the first control parameter, for providing a third parameter data, and the second control channel further including a second signal processing means for processing the first and third control parameter data for deriving a second command value indicative of operational magnitude of the second vehicular component;

first fail detecting means monitoring the first parameter data output from the first monitoring means in order to detect abnormality of the first parameter data value to producing a first fail detecting signal;

second fail detecting means monitoring the second parameter data output from the second monitoring means in order to detect abnormality of the second parameter data value to producing a second fail detecting signal;

third fail detecting means monitoring the third parameter data output from the third monitoring means in order to detect abnormality of the third parameter data value to producing a third fail detecting signal;

first fail-safe means responsive to the first fail detecting signal for performing first mode fail-safe operation, in which fail-safe operation is commonly commanded for both of the first and second control channels for predetermined first mode fail-safe operations in each of the first and second control channels; and second fail-safe means responsive to one of the second and third fail detecting signals, for performing second mode fail-safe operation, in which fail-safe operation is selectively commanded to one of the first and second control channel corresponding to input fail detecting signal for a predetermined second mode fail-safe operation therein.

According to a still further aspect of the invention, a multi-task control system for an automotive vehicle for performing an anti-skid brake control for a vehicular brake system and a power train control for adjusting distribution of a driving torque generated by a prime mover to primary and subsidiary driving wheels, comprises:

a first control channel, associated with the vehicular brake system, for performing anti-skid brake control for optimizing vehicular braking performance, the first control channel processing preselected brake control parameters for deriving a magnitude of wheel acceleration and deceleration and wheel slippage for selecting operational mode of the brake system for selectively increasing, decreasing and holding braking pressure in the brake system;

a second control channel, associated with the power train for adjusting power distribution between a primary driving wheel which is constantly connected to the prime mover to receive driving torque and a subsidiary driving wheel, for which controlled distribution rate of driving torque of the prime mover is supplied, the second control channel processing preselected driving torque distribution control parameters which includes at least one common parameter to the first control channel;

first fail detecting means monitoring the common parameter in order to detect abnormality thereof to producing a first fail detecting signal;

second fail detecting means monitoring the parameter data in the first control channel other than the common parameter in order to detect abnormality thereof to producing a second fail detecting signal;

third fail detecting means monitoring the third parameter data in the second control channel other than the common parameter in order to detect abnormality thereof to producing a third fail detecting signal;

first fail-safe means responsive to the first fail detecting signal for performing first mode fail-safe operation, in which fail-safe operation is commonly commanded for both of the first and second control channels for predetermined first mode fail-safe operations in each of the first and second control channels; and second fail-safe means responsive to one of the second and third fail detecting signals, for performing second mode fail-safe operation, in which fail-safe operation is selectively commanded to one of the first and second control channel corresponding to inputted fail detecting signal for a predetermined second mode fail-safe operation therein.

BRIEF DESCRIPTION OF THE DRAWINGS

The present invention will be understood more fully from the detailed description given herebelow and from the accompanying drawings of the preferred embodiment of the invention, which, however, should not be taken to limit the invention to the specific embodiments, but are for explanation and understanding only.

In the drawings.

DESCRIPTION OF THE PREFERRED EMBODIMENTS

It should be initially noted, in advance of discussion for the preferred embodiment of the invention, that although the following discussion is concentrated to a multiple task control system which has a driving torque distribution control channel and an anti-skid brake control channel, the disclosed system constitutes only one example of implementation of the present invention. Namely, a fail-monitoring technology and fail-safe logic to be herewith discussed should be appreciated to be applicable for variety of multiple task control systems.

Figure 1:
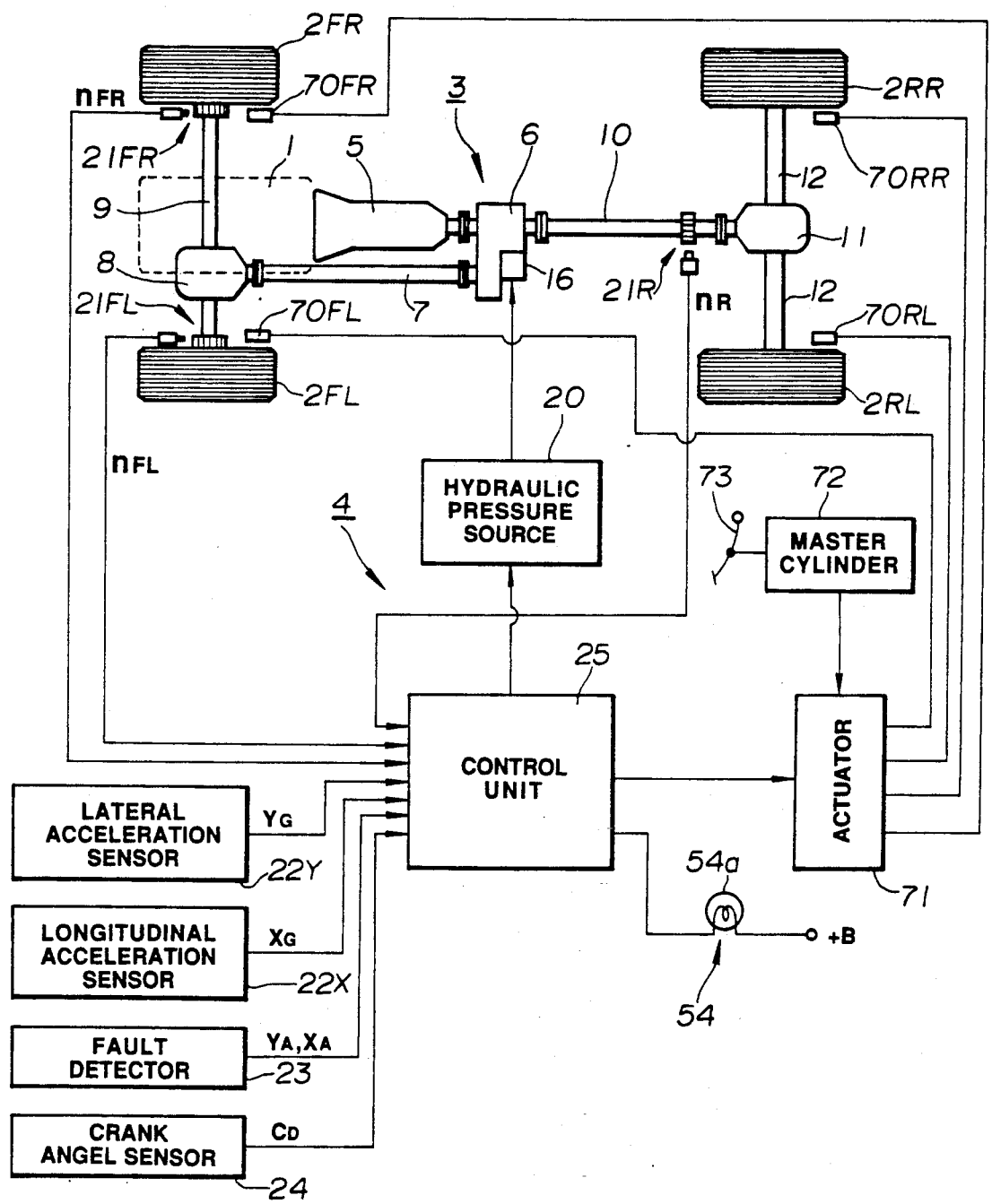
FIG. 1 is a schematic and brief block diagram of the preferred embodiment of an automotive multiple task control system according to the invention, which employs the preferred embodiment of a fail-safe system of the invention.

Referring now to the drawings, particularly to FIG. 1, there is diagrammatically illustrated an automotive vehicle having a four-wheel drive power train layout with variable driving torque distribution between front and rear wheels. For adjusting driving torque distribution through the driving power train, the preferred embodiment of an automotive activity control system, according to the present invention, provides a driving torque distribution control channel. The preferred embodiment of the automotive activity control system also has an anti-skid brake control channel for controlling automotive braking operation for maintaining wheel slippage at predetermined level for maximizing vehicular braking performance.

In the shown construction, the vehicle employs an automotive internal combustion engine 1 as a prime mover. The vehicle has front-left, front-right, rear-left and rear-right wheels 2FL, 2FR, 2RL and 2RR, respectively, serving as driving wheels and thus driven by driving torque of the engine 1 via a power train 3. The power train 3 is associated with a power distribution control channel 4. The power train 3 comprises a power transmission 5 for transmitting the engine output torque with a selected gear ratio, a transfer unit 6 for splitting the engine output torque and selectively distributing the engine output torque for selective front-left and front-right wheels 2FL and 2FR and for normally driven rear wheels 2RL and 2RR. Namely, in the shown construction, the rear wheels 2RL and 2RR serve as primary driving wheels which are permanently connected to the engine 1 to be driven by the driving torque transmitted therefrom, and the front wheels 2FL and 2FR serve as subsidiary driving wheels which are selectively connected and disconnected from the engine 1 and are driven by controlled ratio of driving torque distributed thereto. The power train layout setting the rear wheels as the primary driving wheel is not essential to the present invention and can be reversed to set the front wheels as the primary driving wheels. Furthermore, it may be possible to employ the power train layout for variation of the driving torque between 0% to 100% at both of front and rear wheels is co-related manner.

The transfer unit 6 has a front side output shaft 7 connected to a front differential gear unit 8 and thus transmits the engine output torque via a front drive axle 9. On the other hand, the transfer unit 6 is connected to the rear wheels 2RL and 2RR via a rear side output shaft as a propeller shaft 10, a rear differential gear unit 11 and rear drive axle 12.

Figure 2A:
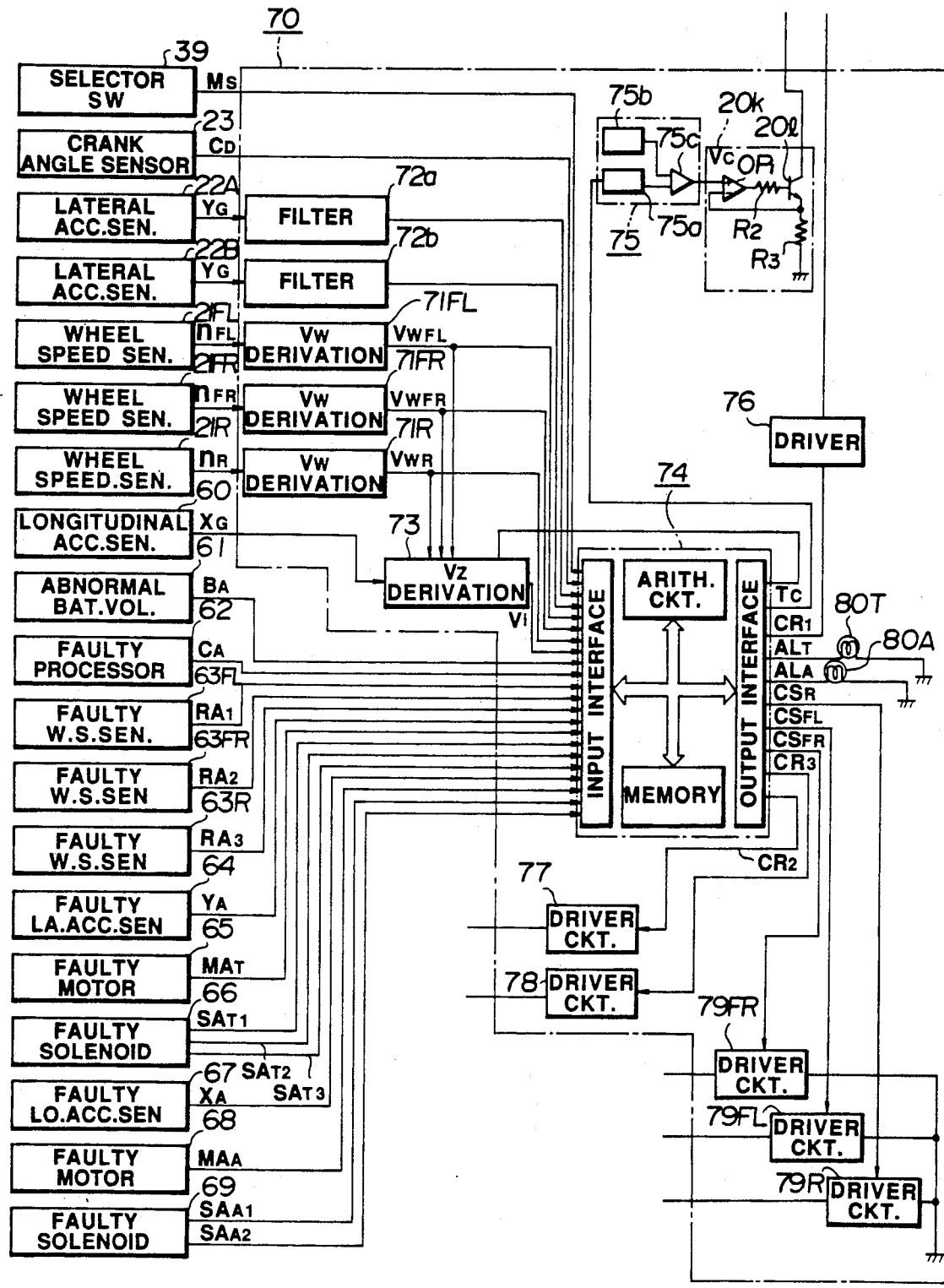
FIGS. 2(a), 2(b) and (c) are block diagrams of the multiple task control system of FIG. 1.
Figure 2B:
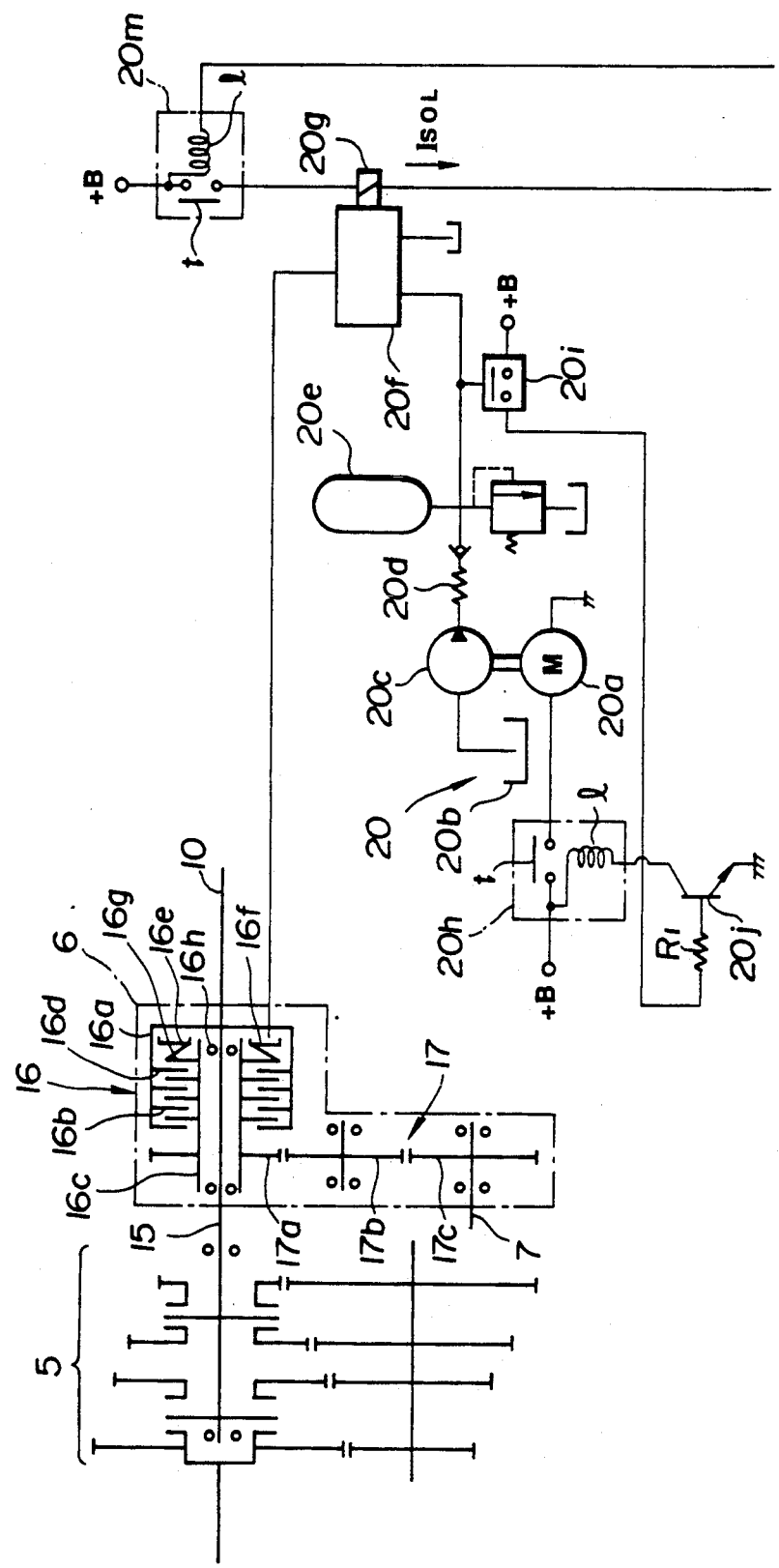

As briefly shown in FIG. 2(b), the transfer unit 6 has an input shaft 15 connected to the output shaft of the transmission 5 at one end and to the propeller shaft 10 at the other end. The transfer unit 6 has a wet-type multiplate clutch assembly 16 which is engaged and disengaged by clutch control pressure Pc supplied from a hydraulic pressure source 20. A gear train 17 is provided between the clutch assembly 16 and the front side output shaft 7 for transmitting part of the driving torque therethrough. The clutch assembly 16 has a clutch drum 16a splined to the input shaft 15 for rotation therewith. A friction plate 16b is integrally coupled with the clutch drum 16a. The clutch assembly 16 also includes a clutch hub 16c rotatable about a needle bearing 17. The clutch hub 16c is rigidly coupled with friction plate 16d. A clutch piston 16e is associated with a cylinder chamber 16f which is defined between the clutch piston and the clutch drum. The clutch piston 16e is normally subjected to resilient bias force through a return spring 16g. The gear train 17 has an input gear 17a which is splined with the clutch hub 16c for rotation therewith, an intermediate gear 17b engaged to the input gear 17a and to an output gear 17c rigidly coupled with the front side output shaft 7 for drivingly rotate the latter.

While the operating pressure in the cylinder chamber 16f is maintained zero, the friction plate 16d is held away from the friction plate 16b to maintain the clutch in disengaged state. Therefore, all of the driving torque transferred to the input shaft 15 is transferred to the propeller shaft 10 and thus used for driving the rear wheels 2RL and 2RR. Therefore, at this time, the vehicle is driven in a rear-wheel drive mode. On the other hand, by supplying a control pressure into the cylinder chamber 16f, the clutch piston 16e is shifted to the position where balance of the pressure in the cylinder chamber and the return spring 16g is established. By this, the clutch piston 16e drives the friction plate 16d toward the friction plate 16b with a depression force variable depending upon the control pressure supplied to the cylinder chamber 16f. Therefore, magnitude of frictional engagement between the friction plates 16b and 16d is determined by the control pressure supplied to the cylinder chamber 16f. At this condition, part of the driving torque is distributed to the front side output shaft 7 via the gear train 17. Here, the magnitude of driving torque to be distributed to the front wheels which will be hereafter referred to as "front wheel driving torque $\Delta T$", can be derived from:

$$\Delta T = P \times S \times 2n \times \mu \times rm$$

where
P: hydraulic pressure
S: effective area of the clutch piston 16e;
n: number of friction plates;
$\mu$: friction coefficient of friction plates; and
rm: effective radius of friction plate.

Figure 3:
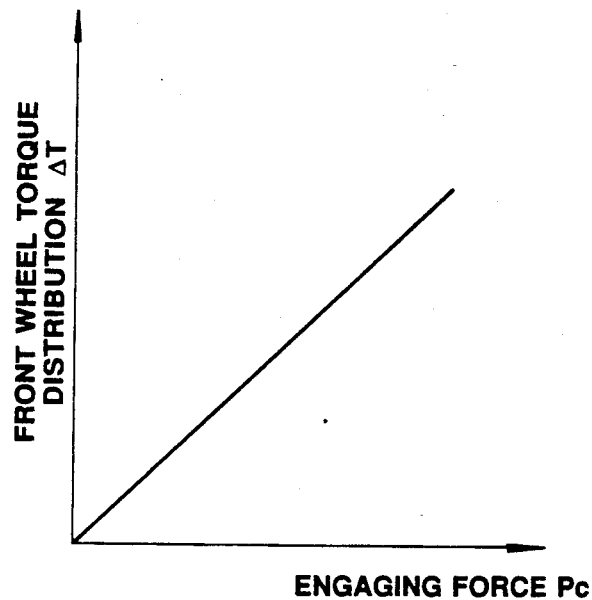
FIG. 3 is a graph showing characteristics of variation of front wheel driving torque in relation to clutch supply pressure.

As shown in FIG. 3, the front wheel driving torque $\Delta T$ is proportional to the control pressure Pc. Therefore, torque distribution between front and rear wheels is variable between 0:100 to 50:50 depending upon the engaging force to be exerted on the clutch assembly 16.

Figure 4:
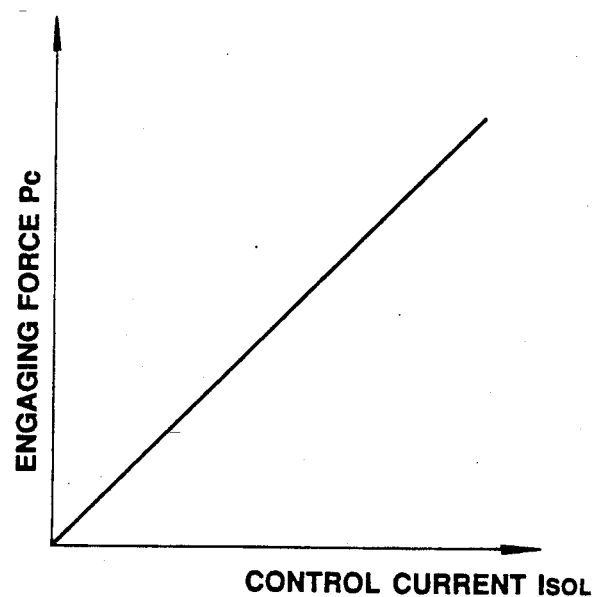
FIG. 4 is a graph showing characteristics of clutch supply pressure in relation to control current.

As shown in FIG. 2(b), the hydraulic pressure source 20 includes an electric motor 20a associated with an oil pump 20c for pressurizing working oil in a reservoir tank 20b for circulation through the transfer clutch assembly 16. A one-way check valve 20d is provided in a supply line downstream of the oil pump 20c. An accumulator 20e is connected to the supply line at an orientation downstream of the one-way check valve 20d and upstream of the clutch assembly 16. Also, a pressure control valve 20f with a proportioning solenoid 20g is also disposed between the accumulator 20e and the clutch assembly 16. The proportioning solenoid 20g is responsive to a control current $I_{SOL}$ supplied from the control unit 25 for controlling the valve position of the pressure control valve 20f and whereby adjusting the control pressure Pc to be supplied to the cylinder chamber 16f. As can be seen from FIG. 4, the control pressure Pc varies in linear fashion proportional to the control current $I_{SOL}$.

The electric motor 20a has an electromagnetic winding connected to a positive power source +B via a motor relay 20h at one end. The other end of the electromagnetic winding of the electric motor 20a is connected to the ground level. The motor relay 20h is controlled by the switch position depending upon the line pressure at the orientation between the accumulator 20e and the pressure control valve, as monitored by means of a pressure switch 20i. In the shown construction, the pressure switch 20i is connected to the base electrode of a switching transistor 20j via a resistor $R_1$. The collector electrode of the transistor 20j is connected to the positive power source +B via a relay coil of the motor relay 20h and the emitter electrode is connected to the ground level. The pressure switch 20i is held OFF while the line pressure in the supply line is higher than a predetermined minimum pressure representative reference value and is turned ON in response to drop below the reference value. In response to turning ON of the pressure switch 20i, the transistor 20j is turned into conductive state to establish a grounding circuit for the relay coil 1 of the motor relay 20h. Therefore, the relay coil 1 is energized to close a normally open contactor t of the relay to drive the electric motor 20a. By this, the oil pump 20c is driven to supply the pressurized working fluid to increase the pressure in the accumulator 20e and in the supply line. On the other hand, the proportioning solenoid 20g is connected to the positive power source +B via an actuator relay 20m at one end and to a solenoid driver circuit 20k at the other end. The solenoid driver circuit 20k has an operational amplifier $OP_1$ having a non-inverting input connected to the control unit 70 to receive therefrom a pressure control voltage signal Vc. The operational amplifier $OP_1$ has an output connected to the base electrode of a power transistor 20l via a resistor $R_2$. The power transistor 20l has the collector electrode connected to the solenoid 20g and the emitter connected to the ground level.

The operations of the relay coil of the actuator relay 20m and the solenoid 20g are controlled by motor control signal $CR_1$ and an actuator control signal Tc supplied from the control unit 70.

Figure 2C:
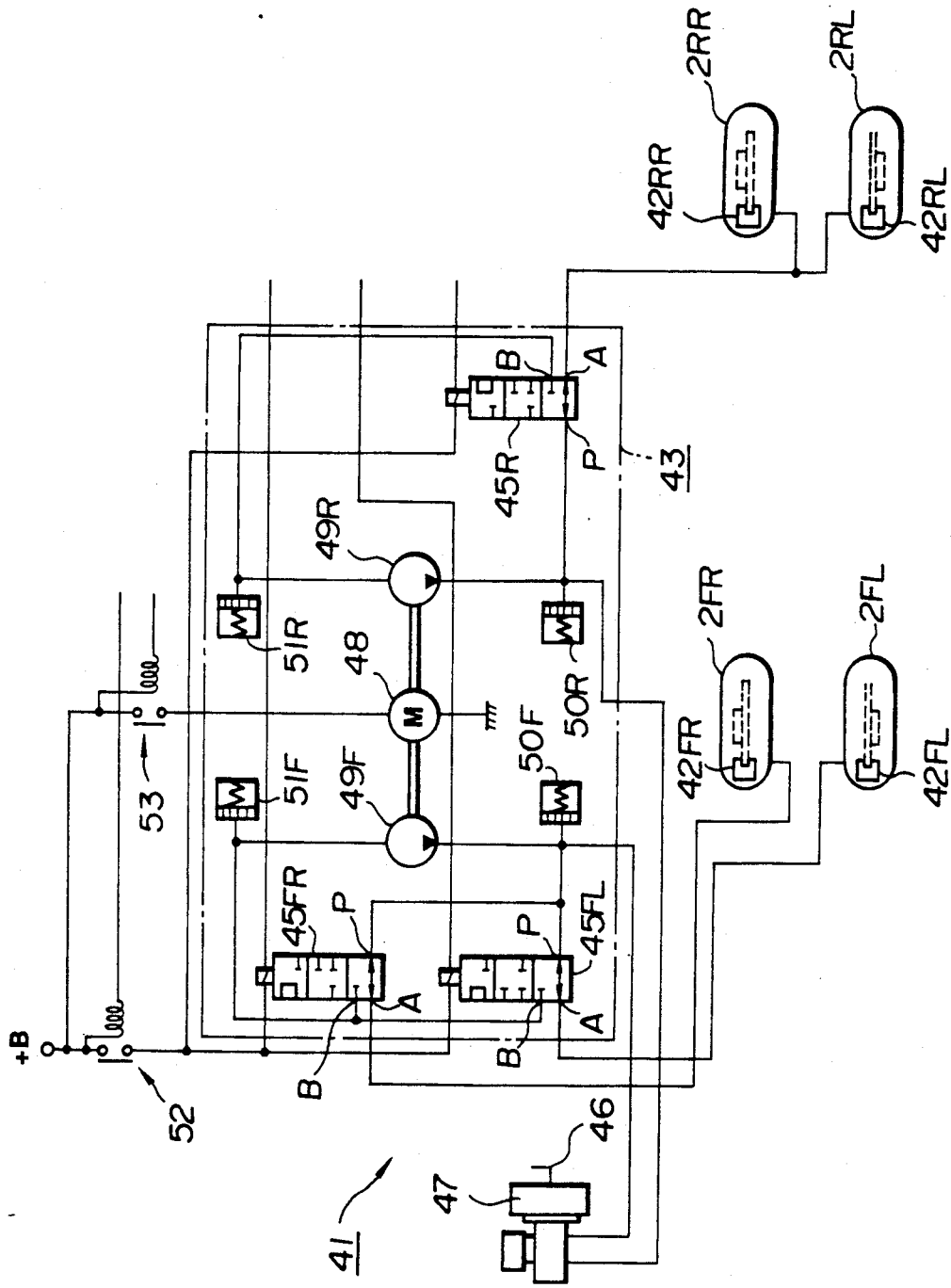

On the other hand, as shown in FIG. 2(c) the anti-skid brake control channel 41 includes electromagnetically operable pressure control valves 45FL, 45FR and 45RR which serve as brake control actuators, respectively disposed within brake circuits for front-left wheel cylinder 42FL, front-right wheel cylinder 42FR and rear wheel cylinders 42RL and 42RR. The pressure control valves 45FL, 45FR and 45R are respectively designed for variation of valve position between APPLICATION mode position for permitting braking fluid pressure built-up in a master cylinder 47 in response to depression of a brake pedal 46, to flow into the associated wheels cylinders 42FL, 42FR, 42RL and 42RR for increasing braking pressure therein, RELEASE mode position for draining the fluid pressure in the wheel cylinders 42FL, 42FR, 42RL and 42RR for decreasing the braking pressure, and HOLD mode position for blocking pressure supply and drain for the wheel cylinder. Pressure accumulators 50F, 50R and 51F, 51R are respectively provided in the drain lines for returning the working fluid from the wheel cylinder 42FL, 42FR, 42RL and 42RR to the master cylinder 47. Fluid pumps 49F and 49R are also provided in the drain lines for recirculating the working fluid toward the master cylinder 17. The fluid pumps 49F and 49R are driven by a common motor 48.

Respective pressure control valves 45FL, 45FR and 45R have electromagnetically operable solenoids which control the valve position between the aforementioned APPLICATION, RELEASE and HOLD mode positions. The solenoids of the pressure control valves 45FL, 45FR, 45R are connected to the power source +B via a valve relay 52. As shown in FIG. 2(a) solenoids are respectively grounded via driver circuits 79FL, 79FR and 79R. The valve relay 52 has a relay coil connected to the control unit 70 via a driver circuit 77. On the other hand, the motor 48 is connected to the power source B via a motor relay 53. The relay coil of the motor relay 53 is connected to the control unit 70 via a driver circuit 78.

With the shown construction, the solenoids of the pressure control valves 45FL, 45FR and 45R and the motor 48 are controlled by relay control signals $CR_2$ and $CR_3$. On the other hand, the driver circuits 79FL, 79FR and 79R are supplied with brake control signals $CS_{FL}$, $CS_{FR}$ and $CS_R$ to adjust resistance therein for adjusting voltage level applied to the solenoids and thus control the valve positions. Therefore, the pressure control valves 45FL, 45FR and 45R control the valve position between the APPLICATION, RELEASE and HOLD mode positions.

In the shown embodiment, the pressure control valves 45FL, 45RL and 45R form a brake control actuator unit 41 together with the motor 48, the fluid pumps 49F and 49R and the pressure accumulators 50F, 50R and 51F, 51R.

The control unit 70 comprises a microprocessor 74 as a primary component thereof. The microprocessor 74 has an input interface, an arithmetic circuit which generally comprises a central-processing-unit (CPU), a memory unit including read-only memory (ROM) and random-access memory (RAM), and an output interface. To the input interface of the microprocessor 74, a variety of sensors, detectors and so forth are connected for supplying parameter data to be used in control operations. In the shown embodiment, the following sensors, detectors and switches are connected to the input interface for providing data necessary for performing driving torque distribution control and anti-skid brake control.

An AUTO/4WD selector switch 39 is directly connected to the input interface for providing a driving mode selector signal MS according to manually selected switch position. The switch 39 is operable between AUTO mode position for selecting automatic adjustment of driving torque distribution between the front and rear wheels and 4WD mode position for selecting four-wheel drive mode to select driving torque distribution for the front and rear wheels at a predetermined ratio, such as 1:1.

A crank angle sensor 23 is designed for monitoring angular position of a crankshaft in an automotive internal combustion engine to produce a crank reference signal at every predetermined angular position of the crankshaft and a crank position signal at every predetermined angle of angular displacement of the crankshaft. Since both of the crank reference signal and the crank position signal have frequencies proportional to the engine revolution speed, an engine revolution speed data can be derived on the basis of one of the crank reference signal and the crank position signal. Therefore, either of the crank reference signal and the crank position signal can be used for deriving the engine speed data. In this connection, in the following disclosure, the output of the crank angle sensor 23 will be hereafter referred to as crank angle signal $C_D$.

Lateral acceleration sensors 22A and 22B are provided for monitoring lateral acceleration exerted on the vehicular body to produce voltage signal and form lateral acceleration indicative signals $Y_{GA}$ and $Y_{GB}$ respectively having voltage level variable depending upon the magnitude of lateral acceleration exerted on the vehicular body. The lateral acceleration sensors 22A and 22B are connected to the input interface of the microprocessor 74 via input filters 72a and 72b. The input filters 72a and 72b filters out noise component superimposed in the lateral acceleration indicative signals $Y_{GA}$ and $Y_{GB}$ and input to the input interface.

Wheel speed sensors 21FL, 21FR and 21R are provided for monitoring rotation speed of associated road wheels. The wheel speed sensors 21FL and 21FR respectively monitor rotation speed of the front-left and front-right wheels 2FL and 2FR for producing front-left and front-right wheel speed indicative signals $n_{FL}$ and $n_{FR}$. On the other hand, the wheel speed sensor 21R is associated with a propeller shaft for monitoring the rotation speed thereof as average rotation speed of rear-left and rear-right wheels 2RL and 2RR to produce a rear wheel speed indicative signal $n_R$.

Figure 5:
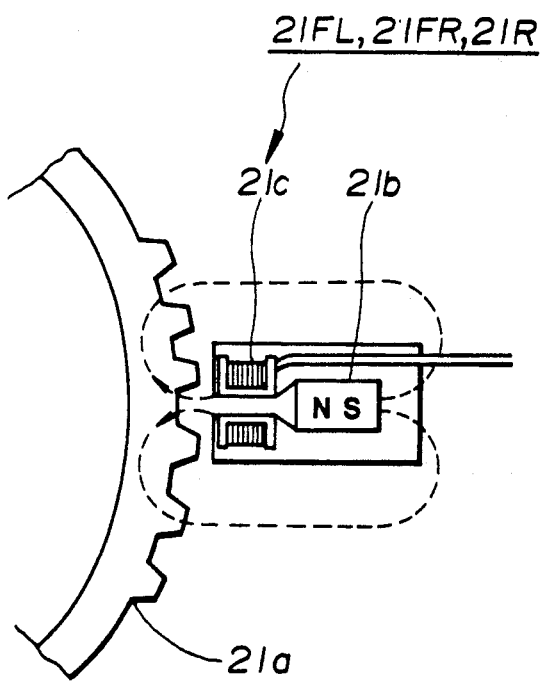
FIG. 5 is a brief and explanatory illustration of a wheel speed sensor to be employed in the automotive activity control system of FIGS. 1 and 2(a)

As shown in FIG. 5, each of the front-left, front-right and rear the wheel speed sensors 21FL, 21FR and 21R comprises a rotor disc 21a with a plurality of circumferentially arranged projections, in which a rotor disc is rigidly coupled with front-left or front-right drive shaft or with the propeller shaft for rotation therewith, and a magnetic pick-up including a permanent magnet 21b and an induction coil 21c. The magnetic pick-up is so designed as to induce a sinusoidal frequency signal having a frequency proportional to the rotation speed of the rotor disc and thus proportional to the rotation speed of the associated drive shaft or propeller shaft.

The wheel speed sensors 21FL, 21FR and 21R are respectively connected to wheel speed derivation circuits 71FL, 71FR and 71R respectively. The wheel speed derivation circuits 71FL, 71FR and 71R are respectively designed for processing the wheel speed indicative signals $n_{FL}$, $n_{FR}$ and $n_R$ for producing front-left, front-right and rear wheel speed data $Vw_{FL}$, $Vw_{FR}$ and $Vw_R$. The process of derivation of the wheel speed data on the basis of the frequency signal or pulse form wheel speed indicative signal has been disclosed in U.S. Pat. Nos. 4,674,049, issued on Jun. 16, 1987, 4,704,684, issued on Nov. 3, 1987, 4,663,715, issued on May 5, 1987, 4,663,716, issued on May 5, 1987, 4,660,146, issued on Apr. 21, 1987, 4,876,650, issued on Oct. 24, 1989, 4,665,491, issued on May 12, 1987, 4,780,818, issued on Oct. 25, 1987, 4,674,050, issued on Jun. 16, 1987, 4,680,714, issued on Jul. 14, 1987, 4,682,295, issued on Jul. 21, 1987, 4,680,713, issued on Jul. 14, 1987, 4,669,046, issued on May 26, 1987, 4,669,045 issued on May 26, 1987, 4,679,146, issued on Jul. 7, 1987, 4,656,588, issued on Apr. 7, 1987, 4,718,013, issued on Jan. 5, 1988, 4,569,560, issued on Feb. 11, 1986, 4,662,686, issued on May 5, 1987, all of which have been assigned to the common assignee to the present invention. The disclosure of the above-identified prior patents are herein incorporated by reference for the sake of disclosure.

The wheel speed data $Vw_{FL}$, $Vw_{FR}$ and $Vw_R$ are supplied to the microprocessor 74 via the input interface. Also, the wheel speed data $Vw_{FL}$, $Vw_{FR}$ and $Vw_R$ are supplied to a vehicle speed representative data derivation circuit 73 which processes the wheel speed data for predicting a vehicle speed representative data Vi. The manner of deriving the predicted vehicle speed representative data Vi will be discussed later. The vehicle speed representative data deriving circuit 73 feeds the vehicle speed representative data Vi to the microprocessor 74.

A longitudinal acceleration sensor 22X is generally designed for monitoring the longitudinal acceleration exerted on the vehicular body for producing a longitudinal acceleration indicative signal $X_G$ to be provided for the control unit 70.

In addition, the shown embodiment of the control system includes a plurality of fail detection circuits for detecting failure of components of the control system. The shown embodiment, includes an abnormal battery voltage detector circuit 61, a faulty microprocessor detector circuit 62, faulty wheel speed sensor detector circuits 63FL, 63FR and 63R, a faulty lateral acceleration detector circuit 64, a faulty motor detector circuit 65, a faulty pressure control valve detector circuit 66, a faulty longitudinal acceleration sensor detector circuit 67, a faulty motor detecting circuit 68 and a faulty electromagnetic valve detector circuit 69.

The abnormal battery voltage detector circuit 61 is associated with a vehicular battery for continuously monitoring battery voltage level to detect a battery voltage lower than a predetermined level. When the battery voltage lower than the predetermined level is detected, the abnormal battery voltage detector circuit 61 produces an abnormal battery indicative signal BA.

The faulty microprocessor detector circuit 62 may be a diagnostic program, such as a watch-dog timer, for detecting failure of the microprocessor operation. Therefore, the faulty microprocessor detector circuit 62 is illustrated in the form of the external circuit for the purpose of illustration and explanation. The faulty microprocessor detector circuit 62 produces a faulty microprocessor indicative signal CA.

Figure 6:
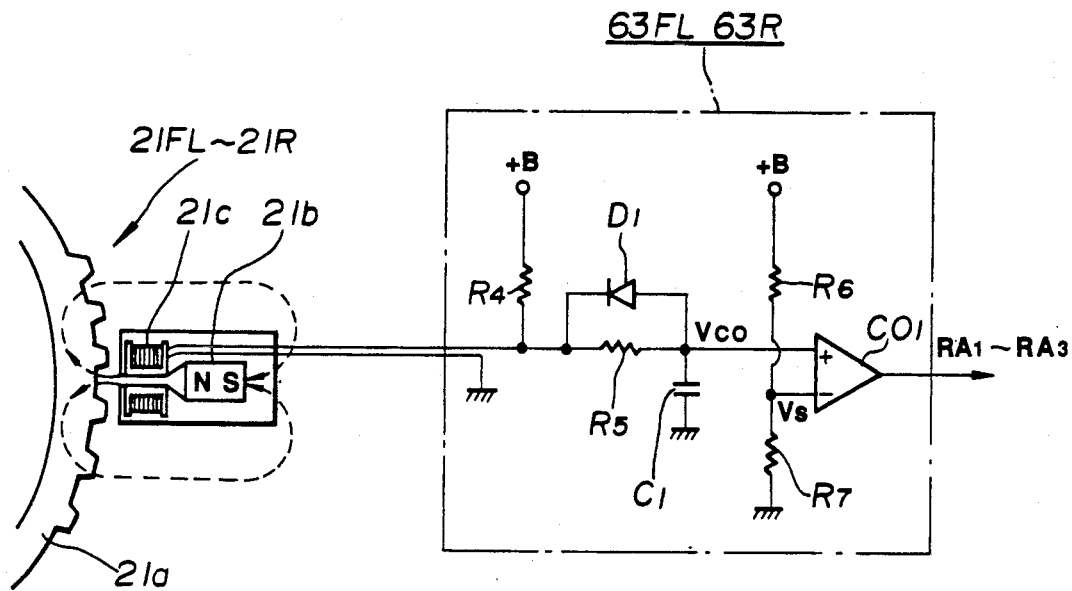
FIG. 6 is a block diagram of a fault detecting circuit for the wheel speed sensor employed in the preferred embodiment of the fail-safe system of the invention.

The faulty wheel speed sensor detector circuits 63FL, 63FR and 63R are designed for detecting failure of respectively associated wheel speed sensors 21FL, 21FR and 21R. FIG. 6 shows the practical or preferred construction of the faulty wheel speed sensor detector circuits 63FL, 63FR and 63R. In the shown circuit construction, the sensor coil 21c of each of the wheel speed sensor 21FL, 21FR and 21R is connected to a power source +B via a resistor $R_4$, at one end. The other end of the coil 21c is grounded through a parallel circuit of a resistor $R_5$ and a diode $D_1$ and a capacitor $C_1$. The capacitor $C_1$ serves as a charge/discharge capacitor. The terminal voltage $V_{CO}$ of the capacitor $C_1$ is supplied to the non-inverting input terminal of a comparator $CO_1$. The comparator $CO_1$ has an inverting input terminal connected to a reference voltage source formed by voltage dividing resistors $R_6$ and $R_7$ to receive a reference voltage Vs. The reference voltage Vs is set at a level to which the charge level of the capacitor $C_1$ will never reach as long as charge and discharge of the capacitor is cyclically performed by the alternating current induced in the coil 21c. On the other hand, when breakage of the sensor soil 21c occurs, the power source voltage +B is directly charged to the capacitor via the resistors $R_4$ and $R_5$. Therefore, the charge level in the capacitor $C_1$ becomes extraordinarily high. With the shown construction, failure of the wheel speed sensor can be detected by detecting the charge level $V_{CO}$ of the capacitor $C_1$ higher than the reference voltage $V_s$. In such case, the output of the comparator $CO_1$ turns into HIGH level due to higher level of the non-inverting input from the capacitor $C_1$ than the reference voltage $V_s$. This HIGH level comparator output serves as a faulty wheel speed sensor indicative signal RA. Therefore, respective of the faulty wheel sensor detector circuits 63FL, 63FR, 63R output the faulty wheel speed sensor indicative signals $RA_1$, $RA_2$ and $RA_3$ when failure of associated one of the wheel speed sensors 63FL, 63FR and 63R is detected.

It should be appreciated that though the specific embodiment of the faulty wheel speed sensor detector circuits are illustrated hereabove as a detector for detecting coil breakage, it may be possible to detect abnormal frequency of the wheel speed sensor output. Furthermore, though the shown embodiment utilizes the analog circuit formed by the capacitor and the comparator for detecting excess interval of the alternating current as the wheel speed sensor output, equivalent fail detecting function can be taken place in digital or analog manner by monitoring cycle period of the alternating current. Namely, since the digitalized control unit processes the wheel speed sensor for deriving the wheel speed data on the basis pulse period or pulse frequency, it may be possible to detect the excess pulse period during process of the wheel speed indicative signals.

Figure 7:
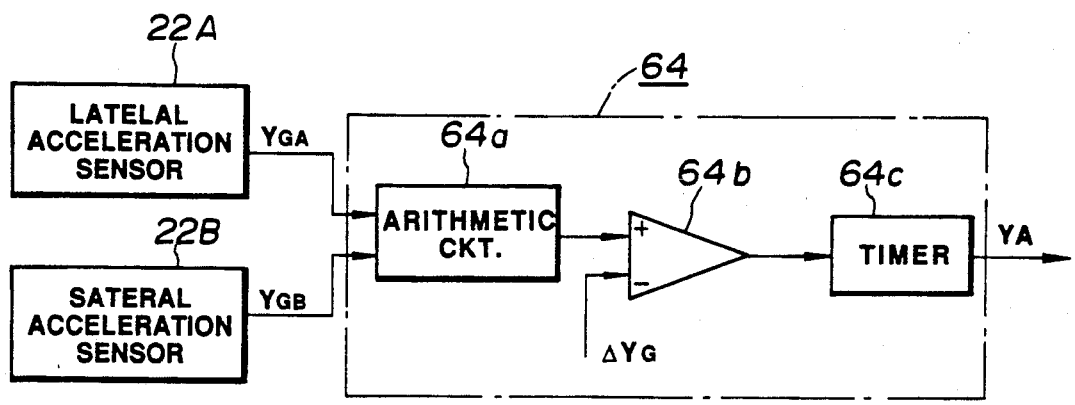
FIG. 7 is a block diagram of a fault detecting circuit for a lateral acceleration sensor employed in the preferred embodiment of the fail-safe system of the invention.

The faulty lateral acceleration sensor detector circuit 64 is illustrated as one example of practical implementation, shown in FIG. 7. The faulty lateral acceleration sensor detector circuit 64 receives the lateral acceleration indicative signals $YG_A$ and $Y_{GB}$ from the lateral acceleration sensors 22A and 22B. The faulty lateral acceleration sensor detector circuit 64 has an arithmetic circuit 64a which derives an absolute value of a difference $\Delta Y_G (= |Y_{GA} - Y_{GB}|)$. The difference indicative signal $\Delta Y_G$ is fed to the non-inverting input terminal of a comparator 64b. The inverting input terminal of the comparator 64b is connected to a reference level generator (not shown) to receive a difference criterion data $\Delta V_{Gref}$. When the value of the difference indicative signal $\Delta Y_G$ is greater than the difference criterion $\Delta Y_{Gref}$, then the comparator output of the comparator 64b is switched into HIGH level. On the other hand, as long as the lateral acceleration sensors 22A and 22B operate in normal state, the difference indicative signal $\Delta Y_G$ stays at a level smaller than or equal to the difference criterion $\Delta Y_{Gref}$. A timer circuit 64c is triggered by the leading edge of the HIGH level comparator output to start the measurement of the elapsed time from the leading edge 64c and terminated by the trailing edge of the HIGH level comparator output. The timer circuit 64c is designed to output HIGH level timer output when the elapsed time thus measured becomes longer than a predetermined period as the faulty lateral acceleration indicative signal $Y_A$.

Figure 8:
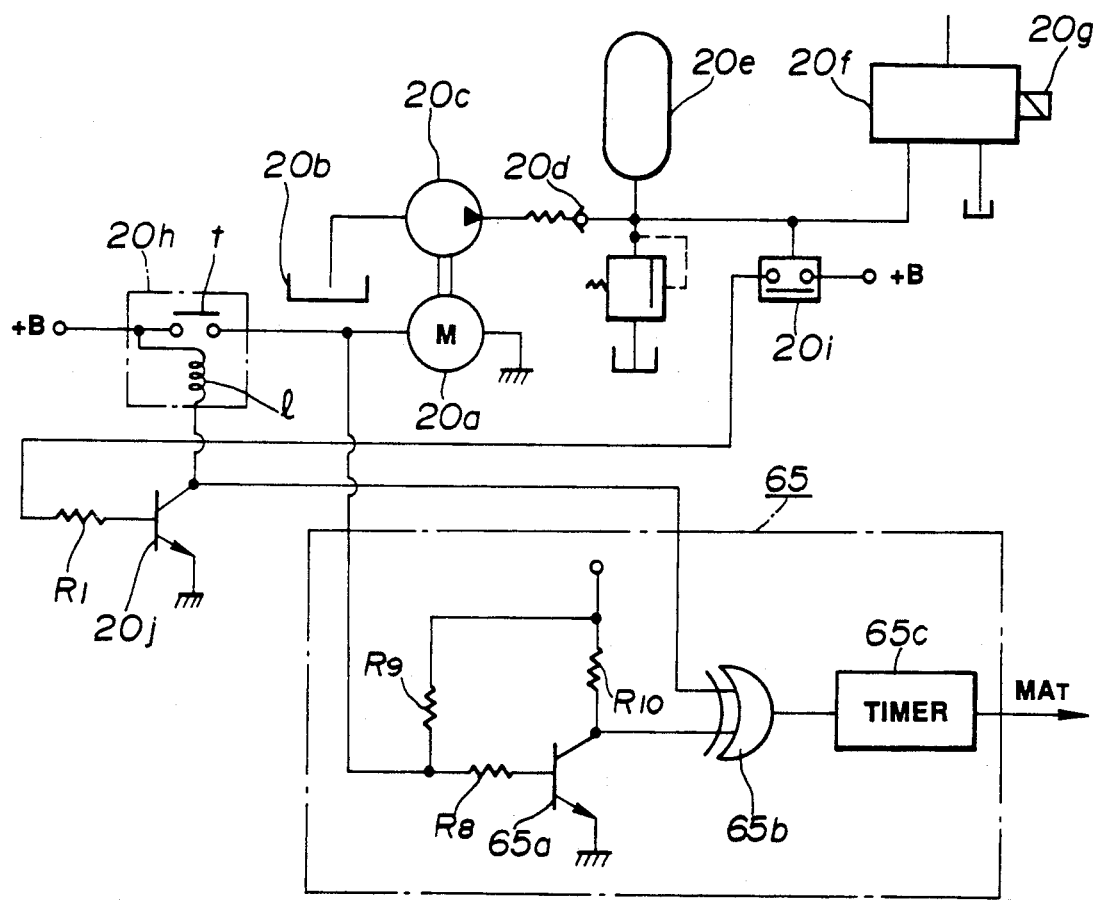
FIG. 8 is a block diagram of a fault detecting circuit for a motor of a fluid pump in a driving torque distribution control channel in the preferred embodiment of the automotive activity control system of the invention.

The faulty motor detector circuit 65 is designed to detect failure of the pump motor 20a in the driving torque distribution control channel. As shown in FIG. 8, the faulty motor detector circuit 65 has a switching transistor 65a which has the base electrode connected to a junction between the motor 20a and a power source +B via a motor relay 20h and a resistor $R_8$. The collector electrode of the switching transistor 65a is connected to the power source +B via a resistor $RT_{10}$, and the emitter electrode thereof is grounded. The collector electrode of the switching transistor 65a is connected to Exclusive OR gate 65b. The other input of the Exclusive OR gate 65b is connected to the collector electrode 20j of the motor driver circuit. In the shown circuit construction, Exclusive OR condition is established only in the abnormality of the motor 20a.

Namely, when the motor 20a and motor relay 20h operate in normal state, if the motor relay switch 20h is turned ON in response to the pressure switch 20i detecting lower level of the fluid pressure by turning ON of the switching transistor 20j, the motor drive current supplied from the power source +B via the motor relay 20h is applied to the base electrode of the switching transistor 65a to make the latter conductive. At this time, the switching transistor 20j and the switching transistor 65a are both held conductive to supply LOW level collector charged to the Exclusive OR gate 65b. Therefore, both of the inputs for the Exclusive OR are maintained at LOW level to maintain the gate output at LOW level. On the other hand, when the switching transistor 20j is turned OFF by LOW level input from the pressure switch 20i, the motor relay 20h is turned OFF to block driver current for the motor 20a. As a result, the input at the base electrode of the switching transistor 65a becomes LOW level to cut-off the transistor. As a result, both inputs of the Exclusive OR gate 65b becomes HIGH level to maintain the gate signal at LOW level. On the other hand, if the motor relay switch 20h is sticked in some reason, the driver current can be supplied to the motor 20a even in the non-conductive or cut-off state of the switching transistor 20j. In such case, the input for the Exclusive OR gate from the switching transistor 20j becomes HIGH level and the input from the switching transistor 65a becomes LOW level. Therefore, the Exclusive OR condition is established to result in HIGH level gate signal. Similarly, when breakage of the motor coil in the motor 20a is caused, power supply from the power source +B is blocked by the breakage of the motor coil. Therefore, when the switching transistor 20j is turned ON to supply LOW level input to the Exclusive OR gate 65b, the input from the switching transistor 65a stays at HIGH level due to continuation of OFF state. Therefore, even at this time, the Exclusive OR condition in the Exclusive OR gate is established.

Therefore, the HIGH level gate signal of the Exclusive OR 65b represents failure of the motor 20a. A timer 65c is connected to the Exclusive OR gate 65b to be triggered by the HIGH level gate signal. The timer 65c outputs HIGH level timer signal when the HIGH level gate signal is maintained for a predetermined period of time, e.g. 0.5 sec. The HIGH level timer signal thus produced serves as a faulty motor indicative signal $MA_T$.

Figure 9:
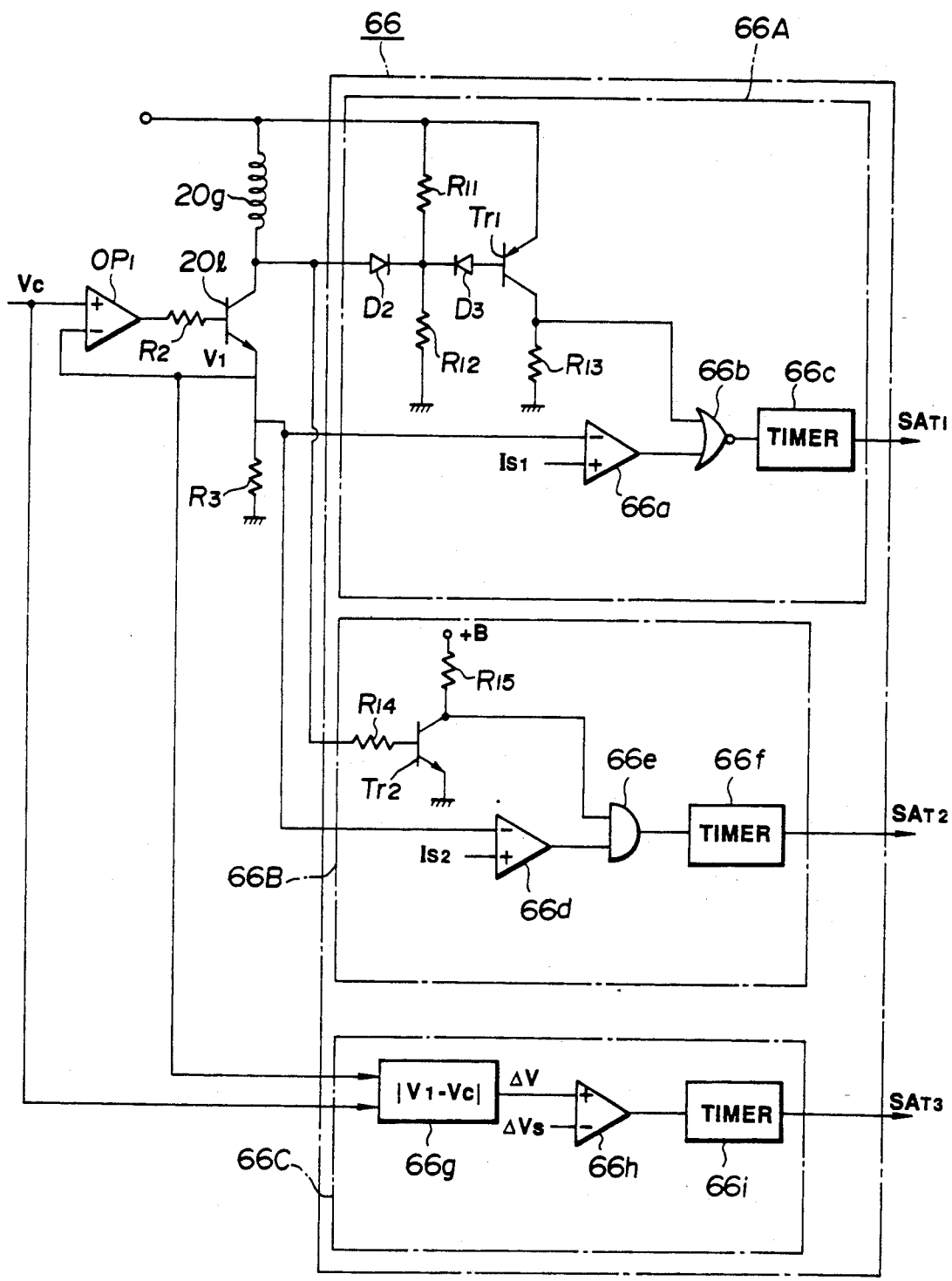
FIG. 9 is a block diagram of a fault detection circuit for a pressure control valve solenoid in the driving torque distribution control channel in the preferred embodiment of the automotive activity control system of the invention.

The faulty solenoid detector circuit 66 comprises a shorting detecting section 66A, a breakage detecting section 66B and a power supply checking section 66c, as shown in FIG. 9. These sections 66A, 66B and 66C are active for detecting failure of the proportioning solenoid 20g in the driving torque distribution control channel.

The shorting detecting circuit 66A has a switching transistor $Tr_1$ connected to the collected electrode of the switching transistor 21c via a voltage divider constituted of resistors $R_{11}$ and $R_{12}$ and a series but opposite polarity of diodes $D_2$ and $D_3$. The resistors $R_{11}$ and $R_{12}$ provide relatively high resistance. Practically, the resistances of the resistors $R_{11}$ and $R_{12}$ are selected to be higher than the resistance of the solenoid 20g. As can be seen, the transistor $Tr_1$ comprises a PNP transistor. The emitter electrode of the power transistor 20l is connected to the inverting input terminal of a comparator 66a. The comparator 66a has the non-inverting input to receive a reference current $I_{S1}$. The output terminal of the comparator 66a is connected to one input terminal of a NOR gate 66b. The NOR gate 66b has another input terminal connected to the collector electrode of the switching transistor $Tr_1$. The inverting output terminal of the NOR gate 66b is connected to a timer circuit 66c which is designed to be triggered by HIGH level gate signal from the NOR gate 66b for starting measurement of elapsed time. The timer circuit 66c is designed to output a HIGH level timer signal which serves as a solenoid shorting indicative signal $SA_{T1}$ when the measured elapsed time reaches a predetermined time.

Practically, while the solenoid 20g is in normal state, when the driver current $I_{SOL}$ flowing through the solenoid coil of the solenoid is maintained at relatively HIGH level, the voltage drop at the solenoid is relatively large to cause turning the switching transistor $Tr_1$ into conductive state. Therefore, the potential at the collector electrode of the transistor $Tr_1$ which is supplied to the NOR gate, becomes HIGH level. At the same time, the driver current $I_{SOL}$ flows through the power transistor 20l. Therefore, the potential at the inverting input of the comparator becomes higher than the reference current $I_{S1}$ supplied to the non-inverting input terminal of the comparator. As a result, the output of the comparator 66a becomes LOW level. As a result, the logical sum in the NOR gate 66b becomes one (1) to output LOW level gate signal. On the other hand, when a clutch engaging command $T_M$ which represents magnitude of engaging force to be exerted on the clutch assembly 16 of the driving torque distribution control channel is maintained substantially zero (0), the driver current $I_{SOL}$ to be supplied to the solenoid 20g substantially become sole of dither current. Therefore, the voltage drop at the solenoid 20g becomes insufficient for turning the switching transistor $Tr_1$ ON. Therefore, the input for the NOR gate 66b from the switching transistor $Tr_1$ becomes LOW level. At the same time, since the driver current $I_{SOL}$ flowing through the solenoid 20g is maintained substantially small, the input level at the inverting input terminal of the comparator 66a becomes LOW level. As a result, the output of the comparator 66a is maintained at HIGH level. As a result, the logical sum in the NOR gate becomes one (1) for maintaining the gate signal at LOW.

When shorting is caused in the solenoid 20g, the transistor $Tr_1$ cannot be biased and thus is constantly maintained in non-conductive state. Therefore, the input level from the switching transistor $Tr_1$ for the NOR gate 66b stays at LOW level. At this condition, if a clutch control signal $V_c$ representative of the commanded engaging force $T_M$ is increased so that the inverting input level at the inverting input terminal of the comparator 66a is higher than the reference current $I_{S1}$, the output level of the comparator 66a becomes LOW level. In such occasion, since both inputs are LOW level, the logical sum in the NOR gate 66b becomes LOW level to induce HIGH level gate signal as the solenoid shorting indicative signal $SA_{AT1}$.

The breakage detecting section 66B has a switching transistor $Tr_2$. The switching transistor $Tr_2$ has the base electrode connected to the collector electrode of the power transistor 20l of the driving torque distribution control channel via a resistor $R_{14}$, the collector electrode connected to the power source $+B$ and the emitter electrode connected to the ground. The collector electrode of the switching transistor $Tr_2$ is also connected to one input terminal of AND gate 66e. The breakage detecting section 66B also has a comparator 66d. The comparator 66d has the inverting input terminal connected to the emitter electrode of the switching transistor 20l and the non-inverting input terminal connected to the reference current source (not shown) to receive therefrom a reference current $I_{S2}$. The output terminal of the comparator 66d is connected to the other input terminal of the AND gate 66e. A timer 66f is provided for monitoring elapsed time after breakage of the solenoid 20g is detected to produce a solenoid breakage indicative signal $SA_{T2}$ after a predetermined period of time, 0.5 sec.

In the normal state of the solenoid, the switching transistor $Tr_2$ is maintained in conductive state unless the power transistor 20l is saturated. While the transistor $Tr_2$ is maintained at ON position, the potential at the collector electrode is maintained at low level. Therefore, AND condition cannot be established in the AND gate 66e. Therefore, the gate signal output from the AND gate 66e is maintained at LOW level. On the other hand, when the power transistor 20l is saturated, the transistor $Tr_2$ is occasionally turned OFF due to lowering of the collector voltage. In such case, since the power transistor 20l stays in ON position, the magnitude of current flowing through the emitter electrode of the power transistor 20l as supplied to the comparator 66d can be greater than the reference current $I_{S2}$. In response to the input current being greater than the reference current $I_{S2}$ from the power transistor 20l, the output level of the comparator 66d changes into LOW level. In such case, the AND condition in the AND gate cannot be established. Therefore, the gate signal level is maintained at LOW level.

On the other hand, breakage of the solenoid 20g occurs therethrough, to block current flow therethrough, the potential applied to the base electrode of the switching transistor $Tr_2$ becomes LOW level to cut-off the latter. As as a result, the potential at the collector electrode of the switching transistor $Tr_2$ is risen to supply HIGH level input to the AND gate 66e. At the same time, it becomes of substantially zero level of the collector charge, the power transistor 20l is also cut-off. Therefore, the current applied to the inverting input terminal of the comparator 66d becomes smaller than the reference current $I_{S2}$. As a result, the output level of the comparator 66d becomes HIGH. Therefore, AND condition in the AND gate 66e is established to output HIGH level gate signal. The timer circuit 66f is responsive to the HIGH level gate signal to start measurement of the elapsed time to produce the solenoid breakage indicative signal $SA_{T2}$ after the predetermined period of time.

The power supply checking section 66C has an arithmetic circuit 66g for deriving a difference $\Delta V$ between the potential $V_1$ at the emitter electrode of the power transistor 20l and the signal level of the driving torque distribution control signal Vc supplied from the microprocessor 74. The arithmetic circuit 66g derives the difference data $\Delta V$ as absolute value of the difference ($|V_1 - Vc|$). The arithmetic circuit supplies the difference data $\Delta V$ to the non-inverting input terminal of a comparator 66h. The comparator 66h has the inverting input terminal connected to a reference value source (not shown) to receive therefrom a reference value ΔVs which represents allowable maximum difference between the driving torque distribution control signal Vc and the emitter voltage of the power transistor 20l. As long as the difference data ΔV is smaller than or equal to the reference value ΔVs, the output level of the comparator 66h is maintained at LOW level. On the other hand, when the difference data ΔV becomes greater than the reference value ΔVs, the output level of the comparator 66h becomes HIGH level. A timer 66i is responsive to the HIGH level comparator signal to start measurement of the elapsed time to output an abnormal power supply indicative signal $SA_T$ after expiration of a predetermined period of time, e.g. 0.5 sec.

Figure 10:
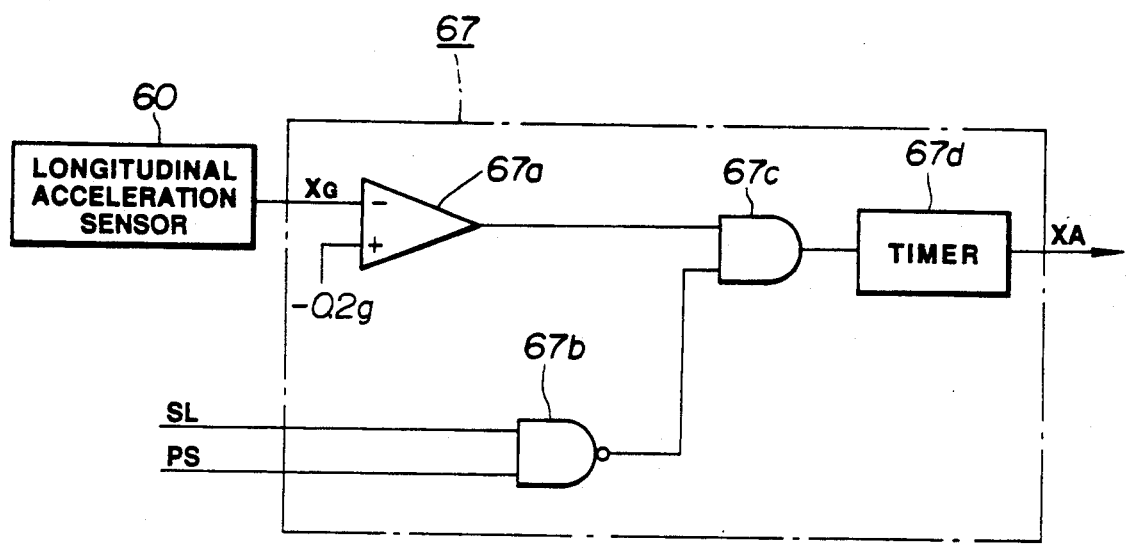
FIG. 10 is a block diagram of a fault detection circuit for a longitudinal acceleration sensor employed in the shown embodiment of the preferred embodiment of the automotive activity control system.

FIG. 10 shows one example of practical implementation of the faulty longitudinal acceleration sensor detector circuit 67. The faulty longitudinal acceleration sensor detector circuit 67 includes a comparator 67a having the inverting input terminal connected to the longitudinal acceleration sensor for receiving therefrom the longitudinal acceleration indicative signal $X_G$. The comparator 67a has the non-inverting input terminal connected to a reference value source (not shown) to receive therefrom a reference value. In the shown embodiment, the reference value is set at a value corresponding to deceleration (negative acceleration) in a magnitude of 0.2 g (−0.2 g of acceleration). The reference value is set at a magnitude of deceleration which cannot occur unless braking operation is performed. Namely, in the normal state of vehicular travel without applying brake, the deceleration force to be exerted on the vehicle is generally the aerodynamic resistance, road/tire friction, engine braking force, up-hill resistance and so forth. The total resistance or deceleration force to be exerted on the vehicle cannot become greater than 0.2 g. Therefore, by setting the reference value at −0.2 g, abnormality can be successfully detected. The comparator 67a outputs the LOW level comparator signal as long as the longitudinal acceleration indicative signal value is greater than the reference value (−0.2 g). The comparator output level becomes HIGH level when the longitudinal acceleration indicative signal value is smaller than or equal to the reference value. The output of the comparator 67a is supplied to one input terminal of an AND gate 67c. The AND gate 67c has another input terminal connected to the inverting output terminal of a NOR gate 67b. The NOR gate 67b has one input terminal connected to a stop lamp switch which is turned ON to illuminate a brake lamp during braking operation to receive therefrom a HIGH level stop lamp switch signal SL. This input represents braking state of the vehicle. Therefore, the input may be replaced with a brake switch detecting depression of a brake pedal or so forth. The NOR gate 67b is also connected to a parking brake switch which is turned ON to feed HIGH level parking brake switch signal PS when a parking brake is applied.

In the normal operation, while the vehicle travels without applying brake, the stop lamp switch signal SL and the parking brake switch signal PS are both maintained at LOW level. As a result, the output level of the NOR gate 67b is maintained at HIGH level. At the same time, since the deceleration force magnitude to be exerted on the vehicle will never become greater than the reference value as set out above, the output level of the comparator 67a is maintained at LOW level. Therefore, AND condition cannot be established in the AND gate 67c. As a result, the gate signal level of the AND gate 67c is maintained at LOW level. On the other hand, when one of the brake lamp switch signal SL and the parking brake switch signal PS turns into HIGH level due to the application of one of foot brake or parking brake, the output level of the NOR gate 67b turns into LOW level. Therefore, even when the magnitude of deceleration becomes greater than the reference value to cause HIGH level comparator signal of the comparator 67a, the AND condition cannot be established in the AND gate 67c.

On the other hand, if both of the stop lamp switch signal SL and the parking brake indicative signal PS are maintained at LOW level to maintain the output level of the NOR gate HIGH, and the longitudinal acceleration indicative signal value $X_G$ is smaller than the reference value to cause HIGH level comparator signal, AND condition is established in the AND gate to output HIGH level gate signal. Since the vehicular deceleration greater than the reference value cannot be caused unless braking operation occurs, judgement can be made that the failure is caused in the longitudinal acceleration sensor 60. A timer 67d is triggered by the HIGH level gate signal from the AND gate 67c to measure the elapsed time to output the faulty longitudinal acceleration indicative signal XA after expiration of a predetermined period of time, e.g. 0.5 sec.

In addition to the aforementioned faulty longitudinal acceleration sensor detection, the shown faulty longitudinal sensor detector circuit 67 also detects breakage of the stop lamp circuit. Namely, if the foot brake is applied to cause deceleration of the vehicle in a magnitude greater than −0.2 g, the output of the comparator turns into HIGH level as set forth above. However, if breakage is caused in the stop lamp circuit, the stop lamp switch signal SL may be maintained at LOW level to cause HIGH level NOR gate output. Therefore, even at this occasion, the AND condition in the AND gate is established for alarming.

Figure 11:
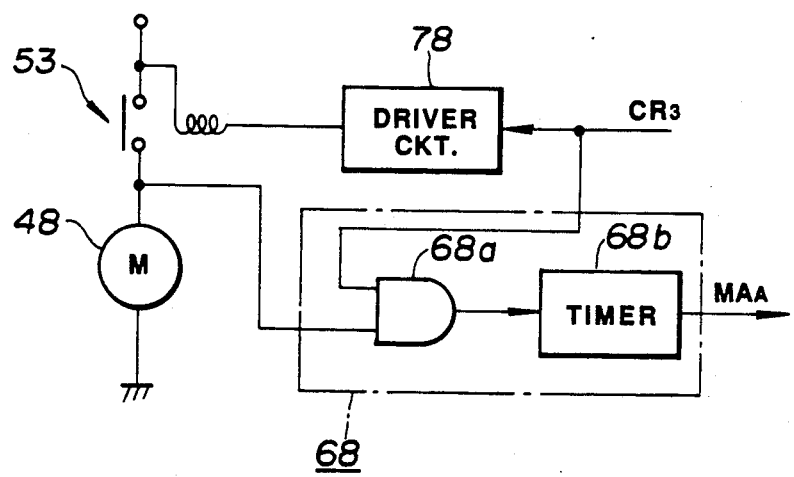
FIG. 11 is a block diagram of a fault detection circuit for a motor of a fluid pump in an anti-skid brake control channel in the preferred embodiment of the automotive activity control system of the invention.

FIG. 11 shows a faulty motor detector circuit 68. The faulty motor detector circuit 68 has an AND gate 68a. The AND gate has one input terminal connected to the microprocessor 74 to receive therefrom a motor relay control signal $CR_3$. The other input terminal of the AND gate 68a is connected to a junction oriented between the motor relay 53 and the motor 48. The motor relay control signal $CR_3$ is produced in response to initiation of anti-skid brake control operation in synchronism with an anti-skid active state indicative signal MR. If breakage is caused in the motor 48 to block driver current flowing therethrough, the driver current supplied through the motor relay 53 causes high potential at the junction where the AND gate 68a is connected. As a result, AND condition is established in the AND gate to output HIGH level gate signal. The gate signal of the AND gate 68a is supplied to a timer circuit 68b. The timer circuit 68b is responsive to the HIGH level gate signal to start measurement of elapsed time so as to output the faulty motor indicative signal $MA_A$ after expiration of a predetermined period, e.g. 0.5 sec.

Figure 12:
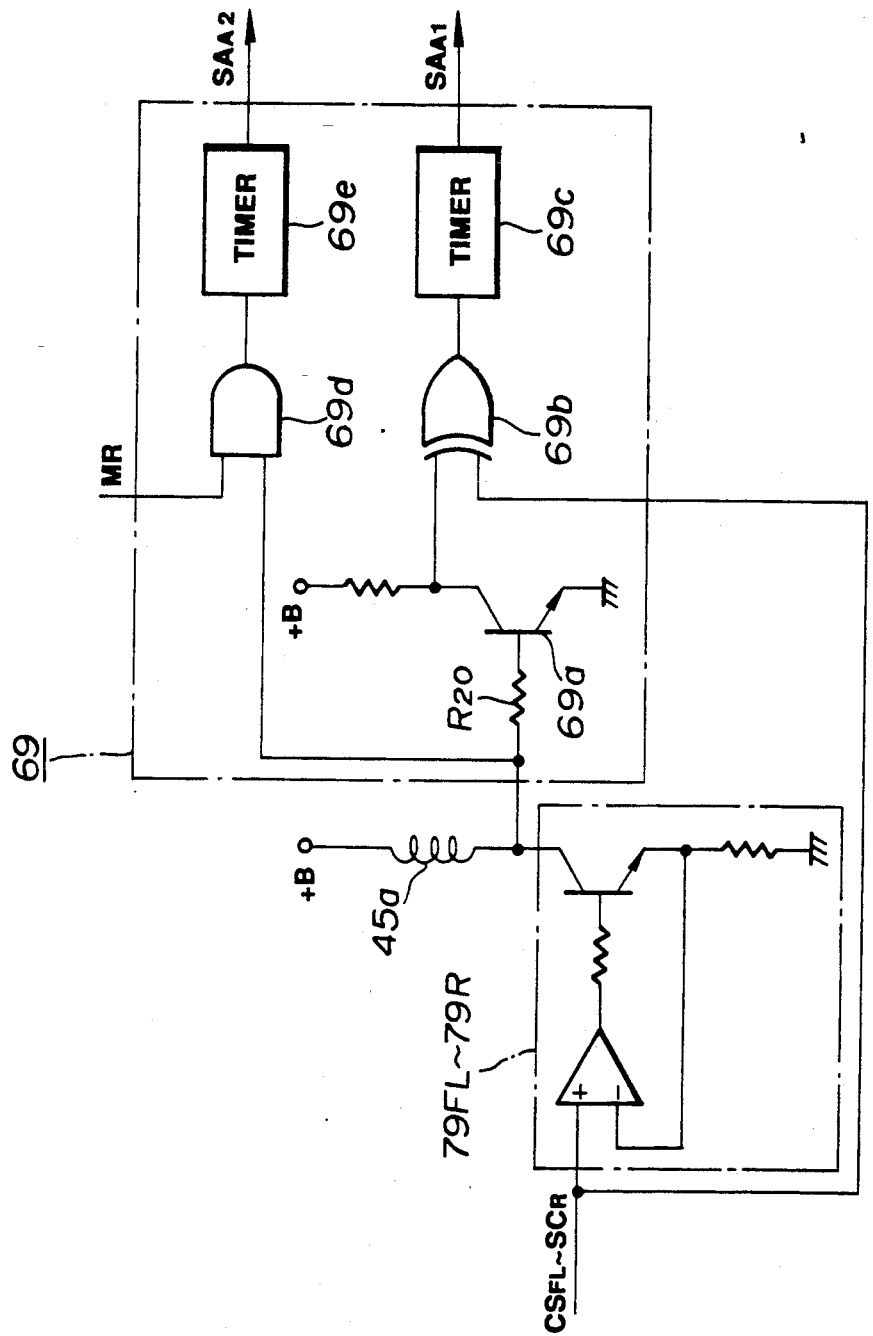
FIG. 12 is a block diagram of a fault detection circuit for an electromagnetic solenoid in the anti-skid brake control channel in the preferred embodiment of the automotive activity control system of the invention.

FIG. 12 shows a faulty solenoid detector circuit 69. This faulty solenoid detector circuit 69 is provided for each of the pressure control valves 45FL, 45FR and 45R for detecting failure of the electromagnetic valve solenoid 45a. The faulty solenoid detector circuit 69 has a switching transistor 69a which has the base electrode connected to a junction between the solenoid coil 45a and a constant current circuit 79FL, 79FR, 79R, via a resistor $R_{20}$. The collector electrode of the switching transistor 69a is connected to one input terminal of an Exclusive OR gate 69b. The other input terminal of the Exclusive OR gate 69a is connected to the microprocessor 74 to receive therefrom relevant one of the anti-skid control signals $CS_{FL}$, $CS_{FR}$ and $CS_R$. The output terminal of the Exclusive OR 69a is connected to a timer circuit 69c which is triggered to measure the elapsed time by the HIGH level gate signal to output a faulty solenoid indicative signal $SA_{A1}$ after expiration of a predetermined period of time, e.g. 0.5 sec. The faulty solenoid detector circuit 69 also has an AND gate 69d having one input terminal connected to the junction between the solenoid coil 45a and a constant current circuit 79FL, 79FR, 79R and the other input terminal connected to the microprocessor 74 for receiving the anti-skid active state indicative signal MR. The output terminal of the AND gate 69d is connected to a timer circuit 69e which is responsive to the HIGH level gate signal to measure the elapsed time to produce a faulty control signal indicative signal $SA_{A2}$ after expiration of a predetermined period of time, e.g. 10 sec.

Namely, if anti-skid brake control is not active and thus the signal level of the anti-skid brake control signals $CS_{FL}$, $CS_{FR}$ and $CS_R$ are maintained at the minimum level for ordering normal APPLICATION mode of the brake systems, the transistor 69a is turned OFF when the breakage is caused in the solenoid 45a to block current flow. Then, the collector voltage of the transistor 69a becomes HIGH level. Then, since the anti-skid control signal $CS_{FL}$, $CS_{FR}$ and $CS_R$ is maintained at LOW level and the collector voltage of the transistor 69a is maintained at HIGH level, OR condition is established in the Exclusive OR gate 69b. Therefore, the gate signal of the Exclusive OR gate 69b becomes HIGH level. Therefore, after expiration of the predetermined period of time from initially detecting breakage of the solenoid, the faulty solenoid indicative signal $SA_{A1}$ is output from the timer circuit 69c.

Figure 13:
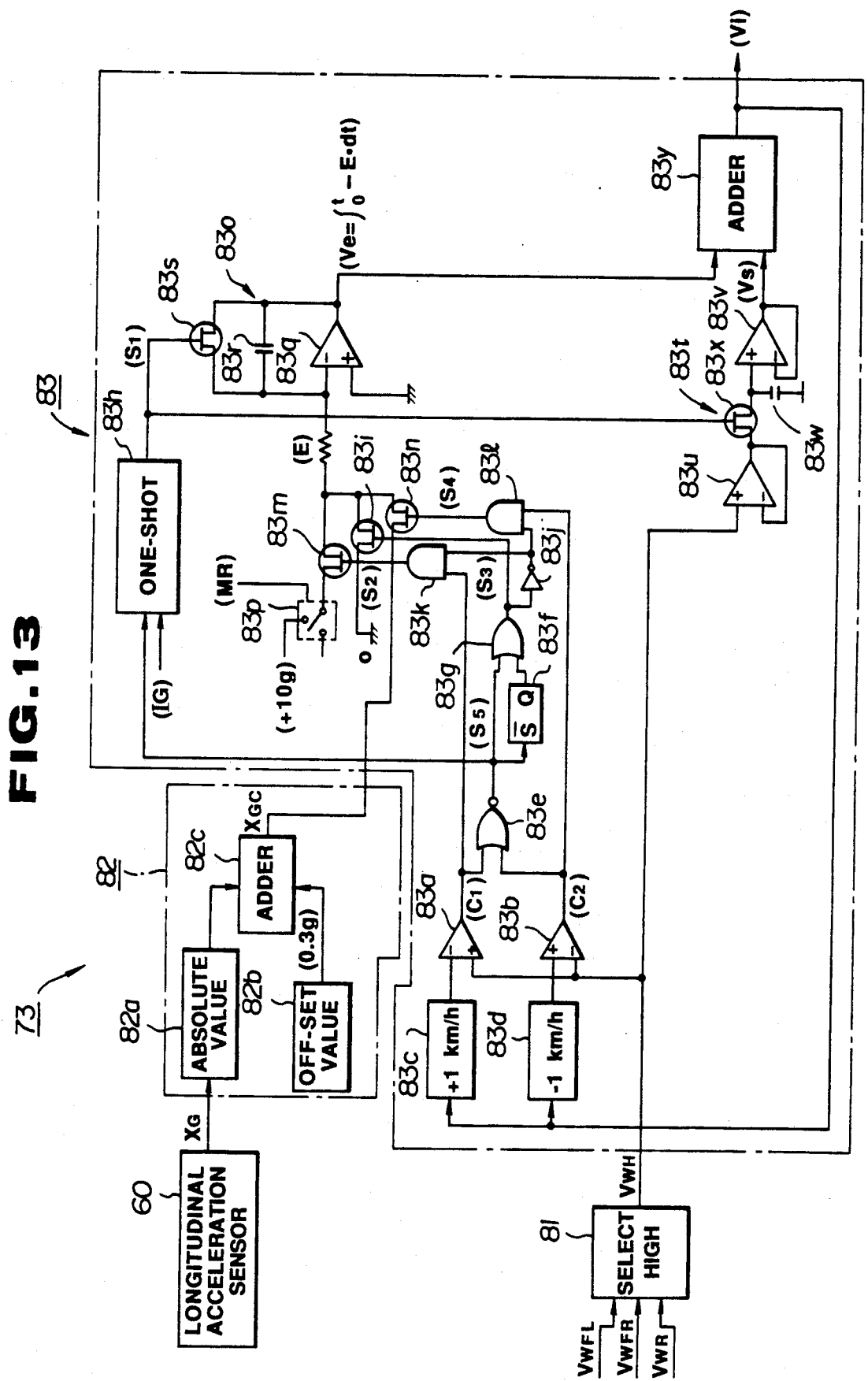
FIG. 13 is a schematic block diagram showing the preferred construction of the pressure control valve unit employed in the anti-skid control channel in the preferred embodiment of control system according to the invention.

On the other hand, when the constant current circuit 79FL, 79FR and 79R as controlled by the anti-skid control signal $CS_{FL}$, $CS_{FR}$ and $CS_R$, stays in a position for permitting minimum current flow for placing the pressure control valve at the APPLICATION mode position after initiation of anti-skid control. Then, both inputs at the input terminals of the AND gate 69d become HIGH to cause HIGH level gate signal. Therefore, if this condition is maintained for the predetermined period, e.g. 10 sec., then, the faulty control signal indicative signal $SA_{A2}$ is output. FIG. 13 shows one example of the pressure control valve unit 45 which may be employed in the shown anti-skid brake control. As can be seen from FIG. 13, the pressure control valve unit 45 includes an inlet control (EV) valve 45a and an outlet control (AV) valve 45b. The pressure control valve unit 45 also includes a drain pump 45d driven by means of an electric motor 45c which is controlled by MR signal from the anti-skid control channel. The pressure control valve unit 45 has an inlet port connected to the master cylinder 47 to receive the working fluid pressure built up in the latter and an outlet port connected to the associated one or two of wheel cylinders 42FL, 42FR, 42RL and 42RR. The wheel cylinders 42FL, 42FR, 42RL and 42RR as generally referred to will be hereafter represented by the reference numeral "42". The EV valve 45a is interposed between the inlet port and the outlet port for controlling introduction of the pressurized working fluid to the wheel cylinder. The AV valve 45b is connected to the outlet of the EV valve 45a, the outlet port at the inlet side and to the pressure accumulator 45e and the drain pump 45d. The discharge outlet drain pump 45d is connected to the inlet port via a one-way check valve 45f for returning part of working fluid in the pressure control valve unit 45 to the fluid reservoir (not shown) and designed for supplying pressurized working fluid.

The EV valve 45a includes an electromagnetic actuator 45g, such as solenoid. The electromagnetic actuator $45g_1$ is connected to the emitter electrode of a power transistor 45h, which comprises PNP transistor and has the base electrode connected to the anti-skid control channel 63. The collector electrode of the power transistor 45h is connected to the positive power source +B via a relay switch 45j. The relay switch 45j has a normally open contact. As long as no fault in the acceleration sensors is detected, the relay coil 1 is held energized for closing normally closed contact for establishing electrical connection between the positive power source +B and the collector electrode of the power transistor 45h. Similarly, the AV valve 45b includes an electromagnetic actuator $45g_2$, such as solenoid. The electromagnetic actuator $45g_2$ is connected to the collector electrode of a power transistor 45i which comprises NPN type transistor and has base electrode connected to the anti-skid control channel. On the other hand, the emitter electrode of the power transistor 45i is connected to the positive power source +B via the switching relay 45j electrode of a power transistor.

With the construction set forth above, the pressure control valve unit 45 essentially operates in three mutually different operational modes. Namely, the pressure control valve unit 45 operates in an APPLICATION mode for increasing braking pressure in the wheel cylinder 42FL, 42FR, 42RL and 42RR, a RELEASE mode for decreasing braking pressure in the wheel cylinder, and a HOLD mode to maintain the braking pressure constant. In the APPLICATION mode position, the EV valve 45a is maintained in open position to establish fluid communication between the master cylinder 47 and the wheel cylinder 42 and the AV valve 45b is maintained in closed position for blocking fluid communication between the wheel cylinder 42 and the pressure accumulator 45e. At the same time, the drain pump 45d may be held delete an inoperative state.

In the RELEASE mode position of the pressure control valve unit 45, the EV valve 45a is held closed to block fluid communication between the inlet port to the outlet port and whereby blocking pressure is supplied from the master cylinder 47 to the wheel cylinder 42. At the same time, the AV valve 45b is maintained at an open position to establish fluid communication between the outlet port, and the pressure accumulator 45e and the drain pump 45d so that the pressurized fluid in the wheel cylinder 42 can be drained to the pressure accumulator 45e or to the fluid reservoir via the drain pump 45d and the one-way check valve 45f. In order to drain part of the working fluid from the wheel cylinder to the fluid reservoir, the drain pump 45d is driven in this RELEASE mode. On the other hand, in the HOLD mode position, both the EV valve 45a and the AV valve 45b are held closed for completely disconnecting the wheel cylinder 42 from the inlet port and the pressure accumulator 45e.

The EV valve 45a is held at an open position in response to LOW level EV signal and shifted to a closed position in response to the HIGH level EV signal. On the other hand, the AV valve 45b is maintained at closed position as long as the AV signal is held at LOW level and is opened by the HIGH level AV signal. The drain pump 45d is driven by the HIGH level MR signal.

The pressure control valve unit 45 is operated in the aforementioned three mode positions over skid control cycles. In general, skid control cycle is scheduled as follows:

1) the pressure control valve unit 45 is maintained at the APPLICATION mode position upon initiation of the braking operation which is triggered by depression of the brake pedal 46, 2) by application of the braking force to the brake pedal, working fluid pressure is built up in the master cylinder 47, since the pressure control valve unit 45 is held at the APPLICATION mode position, the braking pressure in the wheel cylinder 42 is increased linearly in proportion to increasing of the working fluid pressure to decelerate the wheel speed;

3) by increasing the braking pressure, wheel deceleration $-\alpha$ (negative value of wheel acceleration) increases and becomes greater than a predetermined deceleration threshold $-\alpha_2$, the anti-skid control channel is responsive to the wheel deceleration increased across the deceleration threshold to initiate skid control cycle, upon which the skid control cycle enters into HOLD mode cycle period to place the pressure control valve unit 45 at the HOLD mode position to maintain the increased level of braking pressure constant;

4) by holding the increase level of braking pressure in the HOLD mode position of the pressure control valve unit 45, wheel is decelerated to increase wheel slippage across a predetermined wheel slippage threshold, the anti-skid control channel is responsive to the wheel slippage increasing across the wheel slippage threshold to terminal the HOLD mode cycle period and trigger RELEASE mode cycle period, in which the pressure control valve unit 45 is placed in the RELEASE mode position to decrease braking pressure in the wheel cylinder 42;

5) by maintaining the pressure control valve unit 45 in the RELEASE mode position, braking pressure is reduced and thus wheel is accelerated to result in increasing of wheel acceleration $+\alpha$ across a predetermined wheel acceleration threshold $+\alpha_1$, the anti-skid control channel is responsive to increasing of the wheel acceleration $+\alpha$ across the wheel acceleration threshold $+\alpha_1$ to terminate the RELEASE mode cycle period and trigger a HOLD mode cycle period to switch the position of the pressure control valve unit 45 from the RELEASE mode position to the HOLD mode position in order to hold the braking pressure at the lowered level;

6) by maintaining the pressure control valve unit 45 at the HOLD mode, wheel speed is resumed and increased across the vehicle body speed and subsequently returned to the speed corresponding to the vehicle body speed, the anti-skid control channel is responsive to the wheel speed once increased across the vehicle body speed and subsequently returned to the vehicle body speed to terminate HOLD mode cycle period and trigger APPLICATION mode cycle period;

The skid cycles 3) to 6) are repeated while anti-skid control is active.

The shown embodiment of the anti-skid brake control system is triggered in response to turning ON of the ignition switch to initiate power supply. Then, wheel speed sensors 21FL, 21FR and 21R start monitoring the rotation speeds of respectively corresponding wheels 2FL, 2FR, 2RL and 2RR. The wheel speed sensors 21FL, 21FR and 21R thus continuously produce the wheel speed indicative signals $n_{FL}$, $n_{FR}$ and $n_R$. The alternating current form wheel speed indicative signals $n_{FL}$, $n_{FR}$ and $n_R$ are cyclically or periodically converted into digital wheel speed indicative data $Vw_{FL}$, $Vw_{FR}$ and $Vw_R$ by the wheel speed derivation circuits 71FL, 71FR, 71R set forth above.

Figure 14:
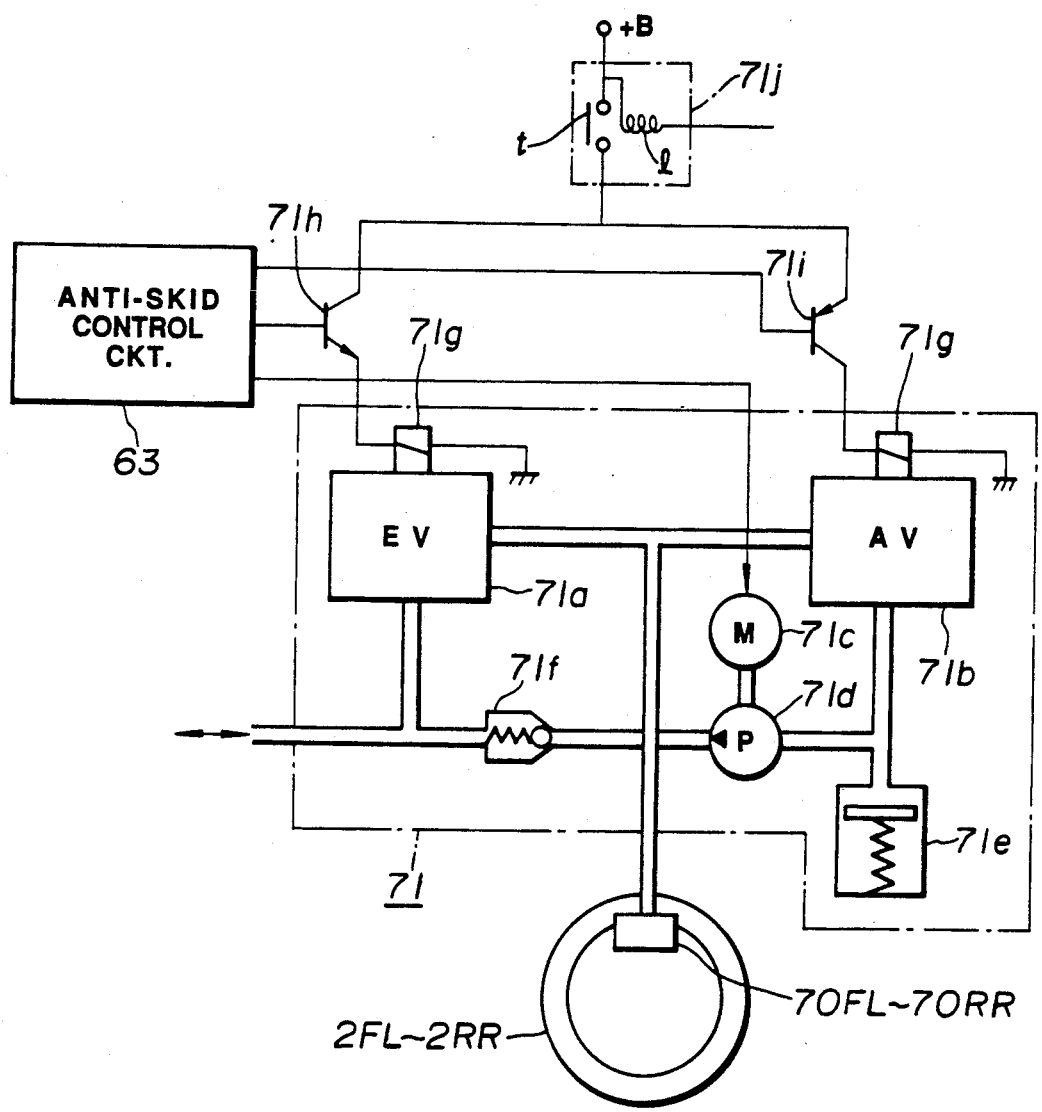
FIG. 14 is a block diagram of a vehicle speed representative data derivation circuit employed in the anti-skid brake control channel in the preferred embodiment of the automotive activity control system of the invention.

FIG. 14 shows the detailed construction of the vehicle speed representing value projecting circuit 73. As set forth above, the vehicle speed representing value projecting circuit 73 derives a vehicle speed representing value Vi based on the wheel speeds $Vw_{FL}$, $Vw_{FR}$ and $Vw_R$ as indicated in the wheel speed indicative signals from the wheel speed derivation circuit 71FL, 71FR and 71R. The vehicle speed representing value projecting circuit 73 includes comparators 83a and 83b. The comparator 83a has a non-inverting input terminal connected to the wheel speed derivation circuits 71FL, 71FR and 71R via a select HIGH circuit 81. On the other hand, the comparator 83b is connected to the wheel speed derivation circuits 71FL, 71FR and 71R at an inverting input terminal. An inverting input terminal of the comparator 83a is connected to output terminal of the vehicle speed representing value projecting circuit 73 through which the vehicle speed representing value Vi is output, through an adder 83c. On the other hand, the non-inverting input terminal of the comparator 83b is connected to the output terminal of the vehicle speed representing value projecting circuit 73 through a subtractor 83d. The adder 83c is designed to add a given value corresponding to 1 km/h of vehicle speed to the vehicle speed representing value Vi for providing dead band of +1 km/h. The value as the sum of the vehicle speed representing value Vi and the dead band value 1 km/h will be hereafter referred to as "higher vehicle speed reference value". Similarly, the subtractor 83d subtracts a given value corresponding to 1 km/h of the vehicle speed from the vehicle speed representing value Vi for providing dead band of $-1$ km/h. The value as the difference of the vehicle speed representing value Vi and the dead band value $-1$ km/h will be hereafter referred to as "lower vehicle speed reference value". The comparator 83a outputs HIGH level comparator signal when the wheel speed $Vw_{FL}$, $Vw_{FR}$ or $Vw_R$ is higher than or equal to the higher, vehicle speed reference value (Vi$_1$ + 1 km/h). In other words, the comparator signal level of the comparator 83a is held LOW as long as the wheel speed $Vw_{FL}$, $Vw_{FR}$ or $Vw_R$ is maintained lower than the lower vehicle speed reference value (Vi + 1 km/h). The comparator 83b outputs HIGH level comparator signal when the wheel speed $Vw_{FL}$, $Vw_{FR}$ or $Vw_R$ is lower than the lower vehicle speed reference value (Vi $-$ 1 km/h). In other words, the comparator signal level of the comparator 83a is held LOW as long as the wheel speed $Vw_{FL}$, $Vw_{FR}$ or $Vw_R$ is maintained higher than or equal to the lower vehicle speed reference value (Vi $-$ 1 km/h).

The output terminals of the comparators 83a and 83b are connected to input terminals of NOR gate 83e to feed the comparator signals $C_1$ and $C_2$ thereto. The NOR gate 83e outputs HIGH level gate signal while signal levels of both of the comparator signals $C_1$ and $C_2$ are maintained LOW. Namely, the gate signal output from the NOR gate 83e is held LOW while the select HIGH input of the wheel speed $Vw_{FL}$, $Vw_{FR}$ or $Vw_R$ is maintained higher than or equal to the vehicle speed representing value Vi−1 km/h and lower than the higher vehicle speed reference value (Vi+1 km/h). The gate signal of the NOR gate 83e is fed to a timer 83f, an OR gate 83g and a shot-pulse generator 83h, respectively. The timer 83f is responsive to the trailing edge of the HIGH level NOR gate signal to output a timer signal for a given period of time, e.g. 0.1 sec. The timer signal is fed to the OR gate 83g.

The OR gate 83g thus receives the NOR gate signal at one input terminal and the timer signal from the timer 83f at the other input terminal. An OR gate signal of the OR gate 83f is transmitted to a gate of an analog switch 83i as a selector signal $S_3$. The output terminal of the OR gate 83g is also connected to one input terminal of an AND gates 83k and 83l via an inverter 83j. The other input terminal of the AND gate 83k is connected to the output terminal of the comparator 83a to receive therefrom the comparator signal $C_1$. Similarly, the other input terminal of the AND gate 83l is connected to the output terminal of the comparator 83b to receive the comparator signal $C_2$ therefrom. Therefore, the gate signal $S_2$ of the AND gate 83k becomes HIGH while the comparator signal $C_1$ is maintained at HIGH level and the NOR gate signal is held LOW. The gate signal $S_2$ serves as a selector signal. On the other hand, the gate signal $S_4$ of the AND gate 83l becomes HIGH level while the comparator signal $C_2$ is maintained HIGH and the NOR gate signal is held LOW. This gate signal $S_4$ also serves as selector signal. The AND gates 83k and 83l are connected to gates of analog switches 83m and 83n.

The analog switch 83i is turned ON in response to HIGH level selector signal $S_3$ to drop the supply voltage to an integrator circuit 83o to zero. On the other hand, the analog switch 83k is turned ON in response to the HIGH level selector signal $S_2$ to supply a voltage E corresponding to a possible maximum wheel acceleration, e.g. 0.4 G, to the integrator circuit 83o. The analog switch 83n is connected to a correction circuit 82 which is designed for correcting the longitudinal acceleration indicative signal value $X_G$ for deriving a minimum wheel acceleration representative value $X_{GC(-m)}$. The analog switch 83n is likewise turned ON in response to the HIGH level selector signal $S_4$ to supply a voltage corresponding to possible minimum wheel acceleration value to the integrator circuit 83o.

The correction circuit 82 includes an absolute value circuit 82a connected to the longitudinal acceleration sensor 22X to receive therefrom the longitudinal acceleration indicative signal $X_G$ and output absolute value signal representative of the absolute value $|X_G|$ of the longitudinal acceleration indicative signal. The absolute value signal of the absolute value circuit 82a is input to an adder 82c. The adder 82c also receives an offset value from an offset value generator circuit 82b. The adder output is supplied to the analog switch 83n via an inverter 82d as the minimum wheel acceleration representative value $X_{GC(-m)}$.

The integrator circuit 83o has a per se well known construction and is consisted of an amplifier 83q, a capacitor 83r and an analog switch 83s. The gate of the analog switch 83s is connected to the shot-pulse generator 83h to receive therefrom a shot-pulse which serves as a reset signal $S_1$. The integrator 83o is reset by the HIGH level reset signal $S_1$ and is responsive to the trailing edge of the HIGH level reset signal to reset the integrated value. The integrator circuit 83o integrates the supply voltage E after termination of the HIGH level reset signal $S_1$ to output the integrator signal. The shot-pulse generator 83h is responsive to an ON-set signal IG of an ignition switch to generate a first shot pulse as the first reset signal for resetting the integrator circuit 83o. The shot-pulse generator 83h subsequently generate the shot-pulses serving as the reset signal $S_1$ at every leading edge of the HIGH level NOR gate signal. As set forth above, since the NOR gate signal becomes HIGH when the select HIGH input of the wheel speeds $Vw_{FL}$, $Vw_{FR}$ and $Vw_R$ satisfies (Vi−1 km/h)>=Vw>(Vi+1 km/h), the integrated value of the integrator 83o is reset every occurrence of the wheel speed Vw in the aforementioned range. The reset signal $S_1$ of the shot-pulse generator 83h is also supplied to a sample hold circuit 83t. The sample hold circuit 83t comprises a buffer amplifiers 83u and 83v, a capacitor 83w and an analog switch 83x. The analog switch 83x is connected to the shot-pulse generator 83h to receive the reset signal $S_1$ at the gate thereof to be turned ON. The sample hold circuit 83t is responsive to turning ON of the analog switch 83x to reset the held wheel speed value. The sample hold circuit 83t in absence of the reset signal $S_1$ from the shot-pulse generator 83h, samples and holds the instantaneous wheel speed value Vw at the occurrence of the reset signal as a sample value Vs. The sample hold circuit 83t outputs a sample/hold signal having a value indicative of the sample value Vs to an adder 83y. The adder 83y receives the sample/hold signal from the sample hold circuit 83t and integrator signal from the integrator 83o. As will be appreciated, the integrator signal has a value indicative of an integrated value $$Ve\left(=\int_0^t (-E) \cdot dt\right).$$

Therefore, the adder 83y adds the integrated value Ve to the sample value Vs to derive the vehicle speed representing value Vi. The output terminal of the adder 83y is connected to the anti-skid control channel.

Figure 15:
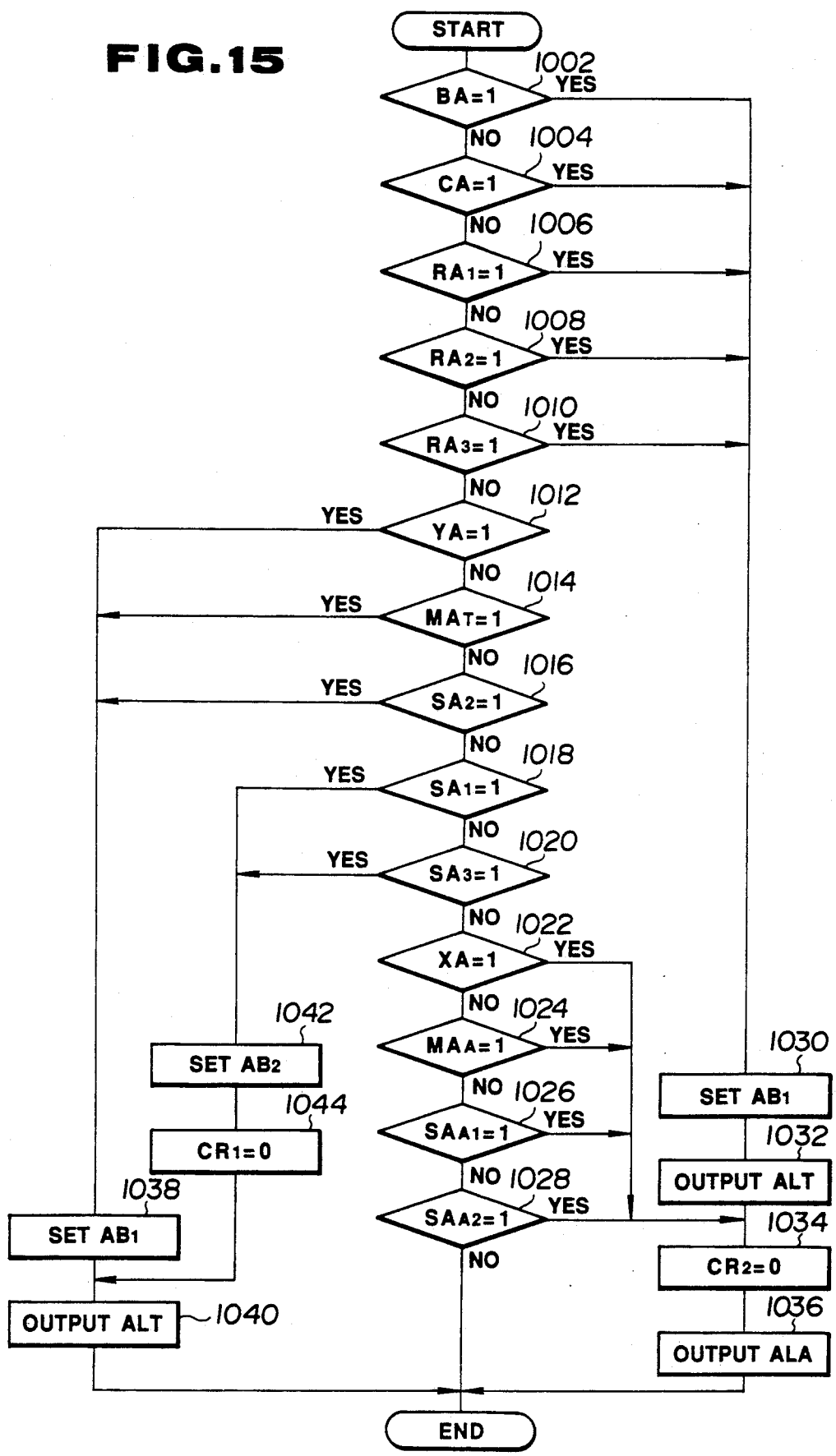
FIG. 15 is a flowchart showing a process of fail-safe operation to be performed by the preferred embodiment of the fail-safe system of the invention.

FIG. 15 shows a routine for detecting failure in the system component and performing fail-safe operation. The shown routine is triggered every predetermined timing with a regular interval. In the process, at a step 1002, the abnormal battery voltage indicative signal BA is checked. When the abnormal battery voltage indicative signal BA is maintained at LOW level to represent normal state of the vehicular battery, the faulty microprocessor indicative signal CA is checked at a step 1004. If the faulty microprocessor indicative signal CA is maintained at LOW level to represent normal state of the microprocessor 74, the faulty wheel speed sensor indicative signal $RA_1$ which represents status of the front-left wheel speed sensor 21FL, is checked at a step 1006. When the faulty wheel speed sensor indicative signal $RA_1$ is at LOW level to represent normal state of the front-left wheel speed sensor 21FL, the faulty wheel speed sensor indicative signal $RA_2$ which represents status of the front-right wheel speed sensor 21FR, is checked at a step 1008. When the faulty wheel speed sensor indicative signal $RA_2$ is at LOW level to represent normal state of the front-right wheel speed sensor 21FR, the faulty wheel speed sensor indicative signal RA$_3$ which represents status of the rear wheel speed sensor 21R, is checked at a step 1010. When the faulty wheel speed sensor indicative signal RA$_3$ is at LOW level to represent normal state of the rear wheel speed sensor 21R, the faulty lateral acceleration sensor indicative signal YA is checked at a step 1012. When the faulty lateral acceleration sensor indicative signal YA is at a LOW level to represent normal state of the lateral acceleration sensors 22A and 22B, the faulty motor indicative signal MA$_T$ which represents operational status of the pump motor 20a in the driving torque distribution control channel, is checked at a step 1014. If the faulty motor indicative signal MA$_T$ is at LOW level to represent normal state of the motor 20a, the solenoid breakage indicative signal SA$_{T2}$ which represents status of the solenoid coil of the solenoid in the pressure control valve 20f in the driving torque distribution control channel, is checked at a step 1016. If the solenoid breakage indicative signal SA$_{T2}$ is maintained at LOW level to represent that the solenoid does not cause breakage, then, the solenoid shorting indicative signal SA$_{T1}$ which represents shorting state of the solenoid by the HIGH level signal, is checked at a step 1018. When the solenoid shorting indicative signal SA$_{T1}$ is at LOW level, the faulty power supply indicative signal SA$_{T3}$ which represents status of power supply for the solenoid 20g, is checked at a step 1020. If the faulty power supply indicative signal SA$_{T3}$ is held at LOW level to represent the normal state of power supply for the solenoid, the faulty longitudinal acceleration indicative signal XA which represents status of the longitudinal acceleration sensor 60, is checked at a step 1022. If the faulty longitudinal acceleration sensor indicative signal XA is at LOW level to represent the normal state of the longitudinal acceleration sensor 60, the faulty motor indicative signal MA$_A$ which represents status of the pump motor 48 in the anti-skid brake control channel, is checked at a step 1024. If the faulty motor indicative signal MA$_A$ is maintained at LOW level, the faulty solenoid indicative signal SA$_{A1}$ which represents status of the solenoid 45a in the pressure control valve unit 45 in the anti-skid brake control channel, is checked at a step 1026. If the faulty solenoid indicative signal SA$_{A1}$ is at LOW level, the faulty solenoid indicative signal SA$_{A2}$ which also represents status of the solenoid 45a in the pressure control valve unit 45 in the anti-skid brake control channel, is checked at a step 1028. If the faulty solenoid indicative signal SA$_{A1}$ is at LOW level, judgement can be made that all components of the combined driving torque distribution control system and the anti-skid brake control system are in normal state. Therefore, process goes to END.

On the other hand, when one of the abnormal battery voltage indicative signal BA, the faulty microprocessor indicative signal CA and the faulty wheel speed sensor indicative signals RA$_1$, RA$_2$ and RA$_3$ is HIGH level as checked through the steps 1002 to 1010 to indicate failure of one of the vehicular battery, the microprocessor 74 and the front-left, front-right and rear wheel speed sensors 21FL, 21FR and 21R, process goes to a step 1030 to set a failure indicative flag AB$_1$ since the vehicular battery, the microprocessor 74 and the front-left, front-right and rear wheel speed sensors 21FL, 21FR and 21R are common elements for both of the driving torque distribution control and anti-skid brake control. Thereafter, an alarm signal ALT indicating failure is generated at a step 1032. Thereafter, a relay control signal CR$_2$ for switching an actuator relay 52 governing power supply for the solenoids 45a of the pressure control valves 45FL, 45FR, 45R, is switched into LOW level to shut-off the relay at a step 1034. Thereafter, an anti-skid failure indicative alarm signal ALA is generated at a step 1036. Thereafter, the process goes to END.

On the other hand, when one of the faulty lateral acceleration sensor indicative signal YA, the faulty motor indicative signal MA$_T$ and the solenoid breakage indicative signal SA$_2$ as checked at the steps 1012, 1014 and 1016 is at HIGH level to indicate failure of one of the lateral acceleration sensors 22A, 22B, the pump motor 20a or breakage of the solenoid 20g, the failure indicative flag AB$_1$ is set at a step 1038. Thereafter, the alarm signal ALT is output at a step 1040. Thereafter, process goes to END.

If HIGH level solenoid shorting indicative signal SA$_1$ or faulty power supply indicative signal SA$_3$ is detected at one of the steps 1018 and 1020, a driving torque distribution control failure indicative flag AB$_2$ is set at a step 1042. Then, a relay control signal CR$_1$ for controlling switch position of the actuator relay 20m is switched into LOW level to shut-off the relay at a step 1044. Subsequently, process goes to step 1040 to output the alarm signal ALT.

On the other hand, when one of the faulty longitudinal acceleration indicative signal XA, the faulty motor indicative signal MA$_A$, the faulty solenoid indicative signals SA$_1$ and SA$_2$ is detected as checked through the steps 1022 to 1028, process goes to the step 1034.

As can be seen herefrom, according to the shown routine, fail-safe operation in response to failure of the component of the control system is differentiated depending upon the type of the faulty element.

Figure 16:
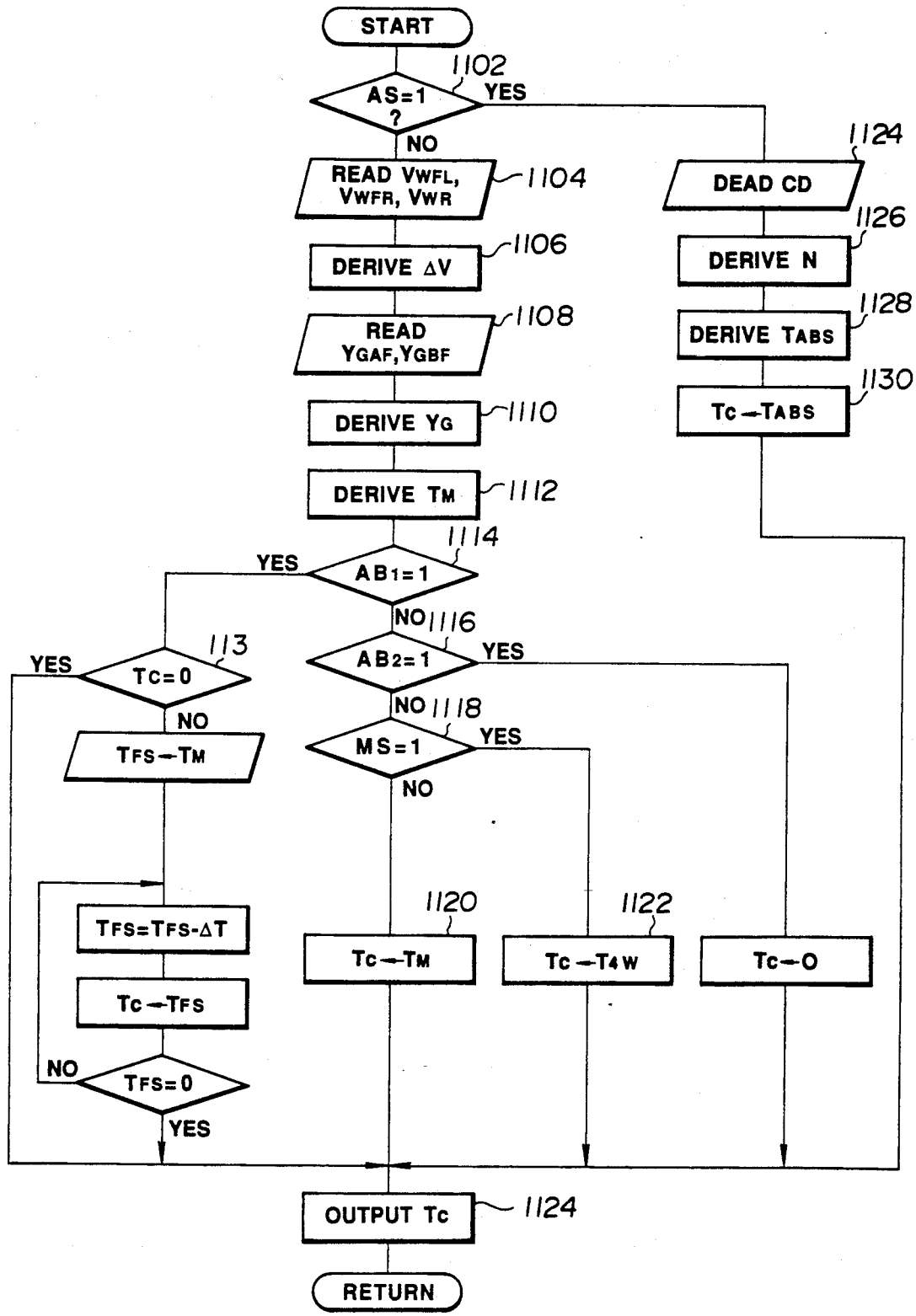
FIG. 16 is a flowchart showing process of torque distribution control to be performed in the driving torque distribution control channel in the preferred embodiment of the automotive activity control system of the invention.
Figure 17:
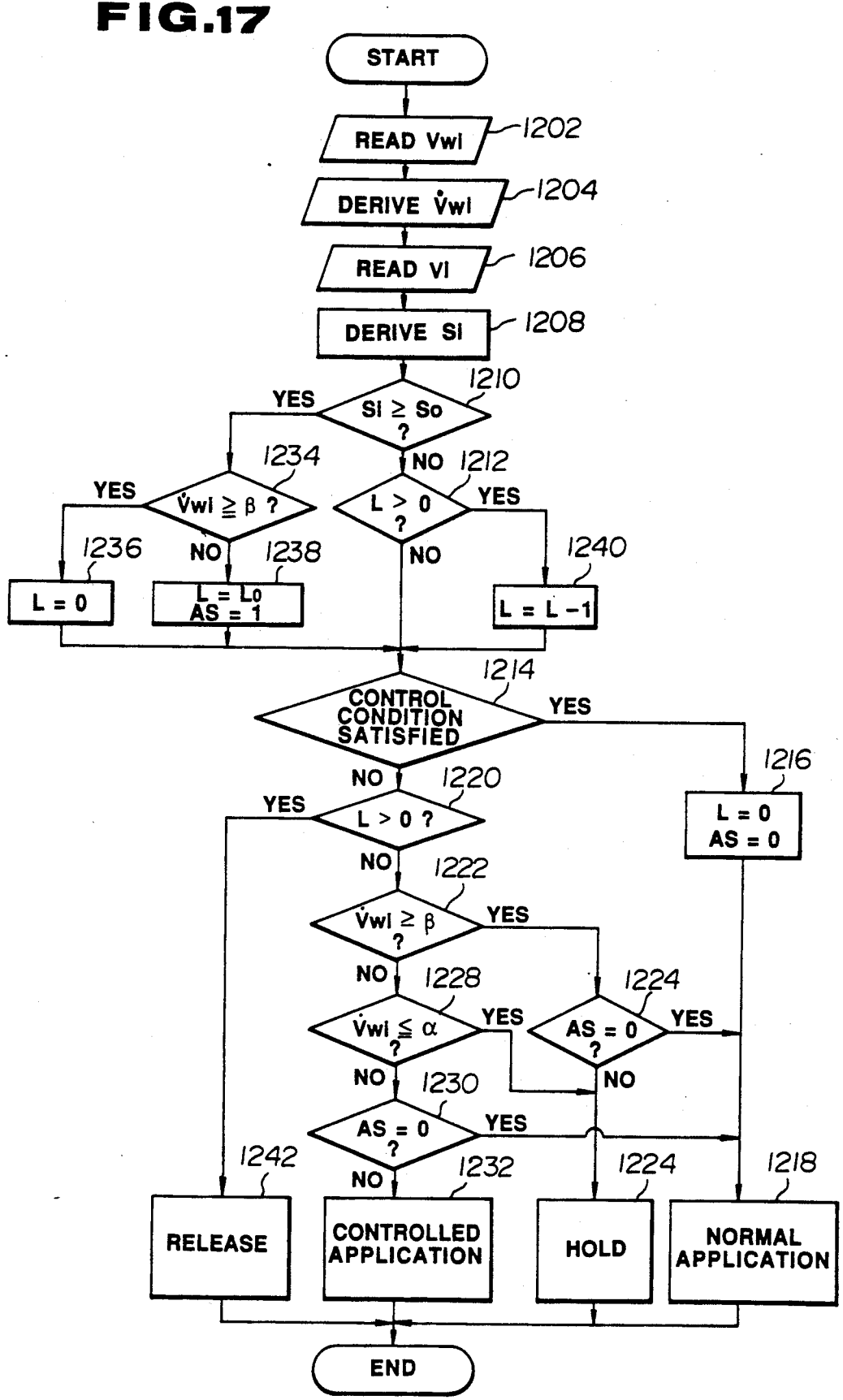
FIG. 17 is a flowchart showing process of anti-skid brake control to be performed by the preferred embodiment of the automotive activity control system of FIG. 2(a)
Figure 18:
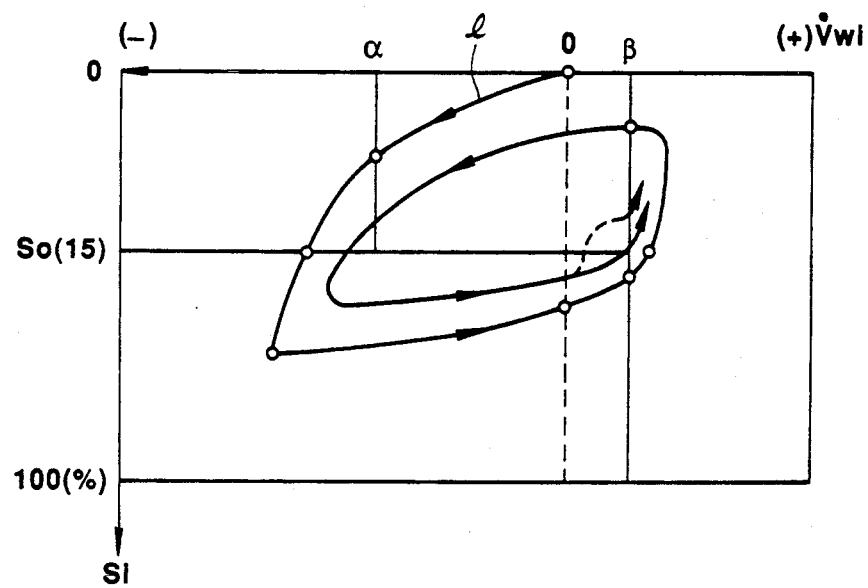
FIG. 18 is a diagram showing process of anti-skid operation to be performed by the preferred embodiment of the automotive activity control system.

FIG. 16 is a routine for performing the driving torque distribution control. Similarly to the foregoing, the driving torque distribution control routine is executed at every predetermined interval.

Immediately after starting execution, the active anti-skid control indicative flag AS is checked at a step 1102 to make judgement whether the anti-skid brake control is active or not. When the active anti-skid brake control indicative flag AS is not set as checked at the step 1102 and thus the judgement can be made that anti-skid brake control is not active, the wheel speed indicative data Vw$_{FL}$, Vw$_{FR}$ and Vw$_R$ are read out at a step 1104. Then, at a step 1106, a difference value ΔVw is derived by the following equation:

$$\Delta Vw = 2Vw_R - Vw_{FL} - Vw_{FR}$$

Thereafter, at a step 1108, the lateral acceleration indicative signals Y$_{GAF}$ and Y$_{GBF}$ which are output of the filters 72a and 72b are read out. Based on these two lateral acceleration indicative signals Y$_{GAF}$ and Y$_{GBF}$ as read out at the step 1108, an average lateral acceleration indicative data Y$_G$ is derived by:

$$Y_G = (Y_{GAF} + Y_{GBF})/2$$

at a step 1110. On the basis of the difference value ΔVw derived at the step 1106 and the average lateral acceleration indicative data Y$_G$, the clutch engaging force T$_M$ is derived at a step 1112. In the practical implementation, the engaging force T$_M$ is derived according to the following equation:

$$T_M = (a/Y_G) \times |\Delta V_w|$$

where a is constant.

Derivation of the engaging force $T_M$ is periodically performed for sampling the engaging force data in appropriate memory blocks which form a shift register. In practice, the shown embodiment has the shift register which can store most recent ten engaging force data $T_M$ for covering 0.5 sec.

After the process at the step 1112, the failure indicative flag $AB_1$ is checked at a step 1114. When the failure indicative flag $AB_1$ is not set as checked at the step 1114, the driving torque distribution control failure indicative flag $AB_2$ is checked at a step 1116. When the driving torque distribution control failure indicative flag $AB_2$ is not set checked at the step 1116, the driving mode selector signal MS is checked whether the signal level is LOW or not for checking if the AUTO mode is selected or not, at a step 1118. If the driving mode selector signal MS as checked at the step 1118 is at LOW and thus the AUTO mode is selected, the engaging force $T_M$ derived at the step 1112 is set as a clutch control command value Tc. On the other hand, when the driving mode selector signal MS as checked at the step 1118 is HIGH level and thus is detected the manual selection of the four-wheel drive (4WD) mode, then the clutch control command value Tc is at set at a preset value $T_{4W}$ for establishing driving torque distribution of 1:1 between the front and rear wheels.

On the other hand, when the active anti-skid brake control indicative signal AS as checked at the step 1102 is HIGH level and thus active state of the anti-skid brake control is detected, the crank angle signal $C_D$ is read out at a step 1126. On the basis of the read crank angle signal $C_D$, an engine revolution speed data N is derived at a step 1128. Then, the engaging force $T_{ABS}$ to be used during active state of the anti-skid brake control, is derived on the basis of the engine revolution speed N, at a step 1130. Practically, the engaging force $T_{ABS}$ is derived from the following equation:

$$T_{ABS} = b \times N - c$$

where b and c are constants,.

Then, the derived engaging force $T_{ABS}$ is at set as the clutch control command value Tc, at a step 1132.

On the other hand, when the failure detecting signal $AB_1$ is HIGH level as checked at the step 1114, check is performed as to whether the clutch control command value Tc is zero, at a step 1134. When the clutch control command signal value Tc is not zero as checked at the step 1134, the engaging force $T_M$ as derived at a predetermined period ahead, e.g. 0.5 sec., is set as a fail-safe mode engaging force value $T_{FS}$, at a step 1136. Then, from the fail-safe mode engaging force value $T_{FS}$, a predetermined magnitude $\Delta T$ is subtracted for deriving the instantaneous clutch engaging command value, at a step 1138. Then, the fail-safe mode engaging force $T_{FS}$ is set as the clutch control command value Tc, at a step 1140. Thereafter, check is performed whether the fail-safe mode engaging force $T_{FS}$ is checked to see whether the force indicative value is decreased to zero (0), at a step 1142. Based upon the answer at the step 1140, process goes back to repeat the process through the step 1138 to 1142.

On the other hand, if the driving torque distribution failure indicative flag $AB_2$ is at HIGH level as checked at step 1116, then, the clutch control command value Tc is set at zero at a step 1144. After the process in one of the steps 1120, 1122 and 1144, when the clutch control command Tc as checked at the step 1134 is set at zero value, or when the fail-safe mode engaging force as checked at the step 1136, process goes to a step 1124 to output the clutch control signal Tc for actually controlling the engaging torque of the clutch assembly.

FIG. 16 shows a skid cycle control routine for controlling the skid control cycle generally according to the schedule set forth in the general discussion of the process of anti-skid brake control.

Immediately after starting execution, the selected average wheel acceleration indicative data $\alpha$ and the selected wheel deceleration threshold $-\alpha_2$ are read out at a step 1202. At a step 1204, the wheel speed indicative data Vw is read out. At a step 1206, the vehicle body speed representative data $V_{ref}$ is read out. At a step 1208, the wheel slippage Si is derived according to the following equation:

$$S_i = \{(V_{ref} - V_w)/V_{ref}\} \times 100(\%)$$

The wheel slippage Si is compared with a predetermined wheel slippage threshold $S_0$ at a step 1210. The wheel slippage threshold $S_0$ may be set at about the optimum wheel slippage range where an optimum vehicle braking efficiency can be obtained. In the shown embodiment, the wheel slippage threshold $S_0$ is set at 15%.

The shown embodiment performs APPLICATION mode operation in mutually different two modes. The braking pressure increases linearly according to increasing of the fluid pressure built up in the master cylinder 72. Such operational mode will be hereafter referred to as "NORMAL APPLICATION mode". The pressure control valve is operated alternatively to the APPLICATION mode position and HOLD mode position for increasing the braking pressure in stepwise fashion. This operation mode will be hereafter referred to as "CONTROLLED APPLICATION mode". The CONTROLLED APPLICATION mode is introduced in order to lower increasing speed of the braking pressure in the wheel cylinder so that the braking pressure is held at a level close to a pressure where the optimum wheel slippage is obtained and hereafter referred to as "lock pressure", for an expanded period.

At the initial stage of the braking operation, wheel slippage Si is held smaller than wheel slippage threshold $S_0$. Therefore, the answer at the step 1210 at the initial braking state becomes negative. Then, at a step 1212, check is performed whether a RELEASE mode timer value L of a RELEASE mode timer (not shown but facilitated in the arithmetic circuit 12c of the microprocessor) is greater than zero or not. At this time, the RELEASE mode timer value L is maintained at zero, the answer at the step 1212 also becomes negative. Then, at a step 1214, judgement is made that the condition satisfies a predetermined skid control terminating condition.

In the practical embodiment, the skid control terminating conditions are set as follows:

when the vehicle body speed indicative data $V_{ref}$ is smaller than or equal to a vehicle body stopping state indicative reference value $V_{ref0}$;

when number of occurrence of switching of the pressure control valve mode position in the CONTROLLED APPLICATION mode becomes greater than or equal to a predetermined value $n_0$; and when the brake switch is turned OFF.

When the skid control terminating condition is satisfied as checked at the step 1214, the RELEASE mode timer value L is cleared and a skid control state indicative period flag AS is reset at a step 1216. At a step 1218, the NORMAL APPLICATION mode skid control cycle period is commanded. Thereafter, process goes to END.

If the skid control terminating condition as checked at the step 1214 is not satisfied, the RELEASE mode timer value L is again checked at a step 1220. When the RELEASE mode timer value L is smaller than or equal to zero as checked at the step 1220, the wheel acceleration α is compared with a predetermined acceleration threshold $+\alpha_1$ at a step 1222. If the acceleration as checked at the step 1222 is greater than or equal to the wheel acceleration threshold $+\alpha_1$, it means that the wheel is not yet decelerated after initiation of increasing of the braking pressure or wheel is acceleration during RELEASE mode cycle period. Therefore, in order to discriminate the instantaneous status of the braking condition, check is performed whether the skid control state indicative flag AS is set at a step 1224. When the skid control state indicative flag AS is not set as checked at a step 1224, then process goes to the process through the step 1218 for setting the operation mode to the NORMAL APPLICATION mode.

On the other hand, when the skid control state indicative flag AS is set as checked at the step 1224, then judgement is made that it is the timing to switch the skid control cycle from the RELEASE mode cycle period to the HOLD mode cycle period because the wheel acceleration α is held greater than the wheel acceleration threshold $+\alpha_1$ and the operational mode is held in the RELEASE mode. Then, HOLD mode cycle period is commanded at a step 1226. After commanding the HOLD mode cycle period, the process goes to END.

On the other hand, when the wheel acceleration α as compared with the wheel acceleration threshold $+\alpha_1$ at the step 1222, is smaller than the acceleration threshold $+\alpha_1$, then the wheel acceleration α is checked with a predetermined wheel deceleration threshold $-\alpha_2$ at a step 1228. When the wheel acceleration α as checked at the step 1228 is smaller than the wheel deceleration threshold $-\alpha_2$, it means that the braking condition requires anti-skid control. Then, at the step 1226, the HOLD mode cycle period is commanded for placing the pressure control valve 16 at the HOLD mode position, at a step 1226.

If the wheel acceleration α as compared with the wheel deceleration threshold $-\alpha_2$ at the step 1228 is greater than the wheel deceleration threshold, the skid control state indicative flag AS is checked at a step 1230. If the skid control mode indicative flag AS is not set as checked at the step 1230, process goes to the step 1218. On the other hand, when the skid control state indicative flag AS is not set as checked at the step 1230, the CONTROLLED APPLICATION mode cycle period is commanded at a step 1232.

On the other hand, when wheel slippage Si as checked at the step 1210 is greater than or equal to the wheel slippage threshold $S_0$, then the wheel acceleration α is compared with the wheel acceleration threshold $+\alpha_1$ at a step 1234. When the wheel acceleration α as checked at the step 1230 is greater than or equal to the wheel acceleration threshold $+\alpha_1$, judgement can be made that the condition does not satisfy to perform the RELEASE mode skid control cycle period operation. Therefore, the RELEASE mode timer value L is cleared at a step 1236. On the other hand, when the wheel acceleration α as checked at the step 1234 is smaller than the wheel acceleration threshold $+\alpha_1$, judgement can be made that a condition for performing the RELEASE mode skid control mode cycle period is satisfied. Therefore, at a step 1238, the RELEASE mode timer value L is set at a predetermined initial timer value $L_0$ which represents a period to maintain RELEASE mode skid control cycle period after the wheel slippage Si is decreased across the wheel slippage threshold $S_0$. At the same time, the skid control state indicative flag AS is set.

When the RELEASE mode timer value L as checked at the step 1212 is greater than zero (0), then, the RELEASE mode timer value L is decremented by one (1) at a step 1240 and thereafter process moves to the step 1214. When the RELEASE mode timer value L as decremented at the step 1240 is still held greater than zero (0), the answer at the step 1220 becomes positive since the RELEASE mode timer value is greater than zero. Then, process goes to a step 1242 to command the RELEASE mode skid control cycle period.

The operation of the projected vehicular speed derivation circuit 73 will be discussed herebelow with reference to FIGS. 10 and 11.

At first the operation of the projected vehicular speed derivation circuit 73 will be discussed assuming that the common wheel speed representative data Vw varies as shown in FIG. 10. It is further assumed that the gradient $(-m)$ is maintained constant.

At a time $t_0$, the ignition switch is turned into ON from OFF position. Therefore, the one-shot pulse generator circuit 84h is responsive to the leading edge of the HIGH level ignition signal IG to generate the shot pulse $S_1$ as shown in FIG. 19(i), which serves as the reset pulse for the integrator circuit 87o and the sample/hold circuit 87t. By the shot pulse $S_1$, the integrator circuit 87o is cleared the integrated value Ve to zero to restart integration of the voltage signals E input through the analog switches 83m, 83i and 83n. At the same time, the sample/hold circuit 87t has reset the sampled value and updated the sampled value Vs with the instantaneous common wheel speed representative data Vw at the time $t_0$. At the time $t_0$, since the integrated value Ve is reset and thus is zero (0), the output value as the projected vehicular speed representative data Vi becomes equal to the sampled value Vs of the sample/hold circuit 87t. Upon starting up of the system in response to turning ON of the ignition switch, the vehicle does not run and thus the wheels are not rotating. Therefore, the common wheel speed representative data Vw supplied from the select HIGH circuit 81 represents zero of wheel speed. As a result, the sampled value Vs becomes zero.

Figure 19:
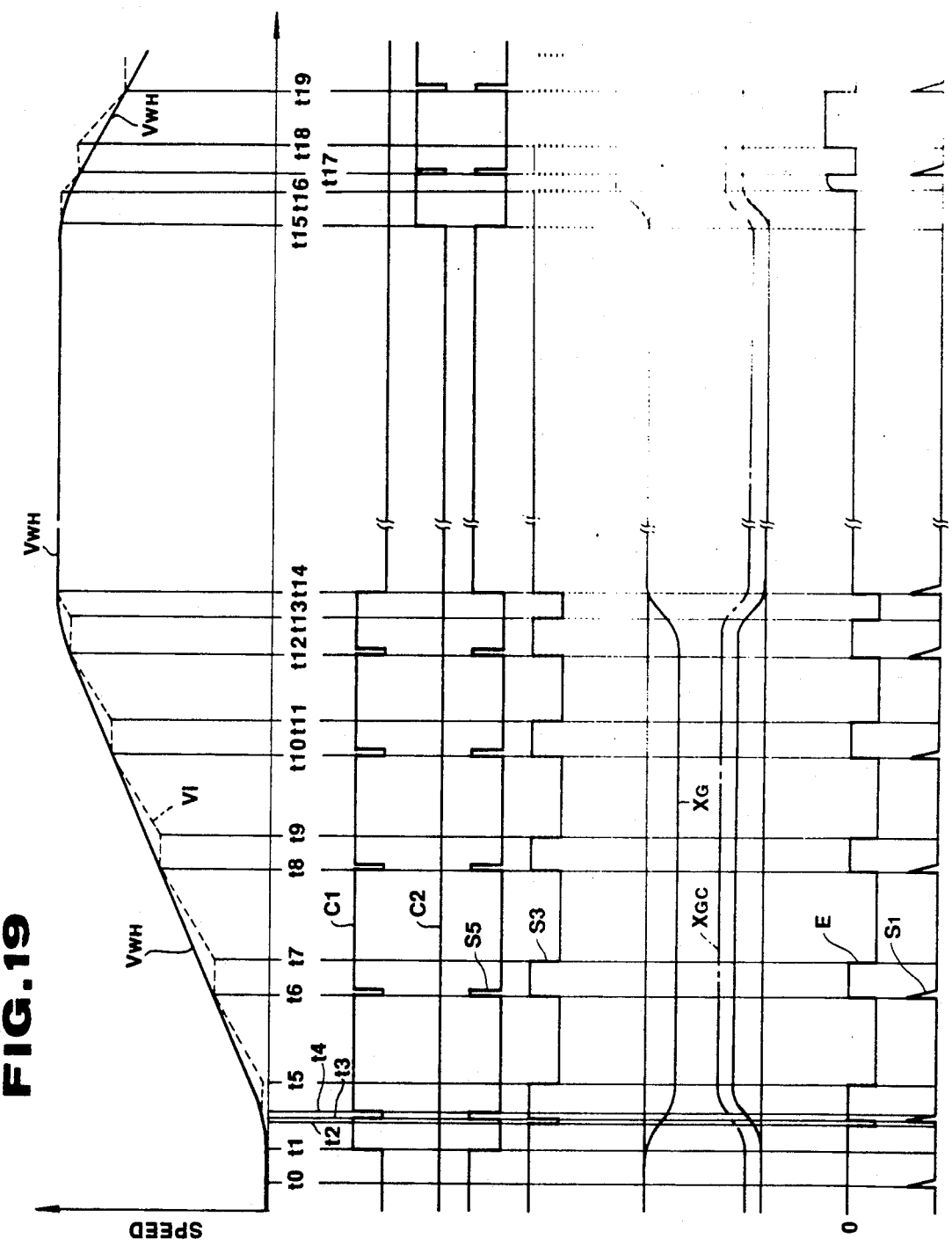
FIG. 19 is a timing chart showing operation of the vehicular speed representative data derivation circuit of FIG. 14.

At this time $t_0$, since the sampled value Vs is equal to the common wheel speed representative data Vw, it becomes smaller than the upper deadband reference signal value Vi+ and greater than the lower deadband reference signal value Vi−. Therefore, both outputs C1 and C2 of the comparators 83a and 83b become LOW level as shown in FIGS. 19(b) and 19(c). Therefore, the output of the NOR gate 63 becomes HIGH level as shown in FIG. 19(d). By the HIGH level gate signal of the NOR gate 83e, the outlet level of the OR gate 83g is maintained HIGH, as shown in FIG. 19(e). The gate signal $S_3$ output from the OR gate 83g serves as select signal for selecting switch position of the analog switch 83*i*. By this HIGH level gate signal S₃ of the OR gate 83*g*, the analog switch 83*i* is turned ON to connect the inverting input terminal of the operational amplifier 83*q* of the integrator circuit 87*o* to the ground. At this time, because of the LOW level comparator signals C1 and C2 of the comparators 83*a* and 83*b*, the AND gates 83*k* and 83*l* are held non-conductive to maintain respectively associated analog switches 83*m* and 83*n* at non-conductive state. Since the analog switch 83*i* is connected to the ground level for grounding, the input voltage E for the integrator circuit 83*o* is maintained zero, as shown in FIG. 19(*h*). Therefore, the integrated value of the integrator circuit 87*o* is maintained zero. Therefore, the projected vehicular speed representative data Vi is maintained at the sampled value Vs.

Then, vehicle starts to run. According to staring of vehicle running, the longitudinal acceleration $X_G$ increases accordingly. At the same time, according to running of the vehicle, the wheel rotates to cause increasing of the wheel speed indicative signal values. Assuming the common wheel speed representative data Vw becomes greater than or equal to the upper deadband reference signal value Vi+ at a time $t_1$, the output level of the comparator 83*a* turns into HIGH as shown in FIG. 19(*a*). By turning the comparator signal C1 into HIGH level, the output level of the NOR gate 83*e* becomes LOW. However, at this time, the off-delay timer 83*f* is set by the trailing edge of the HIGH level gate signal of the NOR gate 83*e* to input HIGH level signal to the OR gate 83*g* for the given period of time $T_3$. Therefore, during the period $T_3$, the output level of the OR gate 83*g* is maintained at HIGH level as shown in FIG. 19(*e*). By this HIGH level gate signal of the OR gate 83*g*, the one input to the AND gate 83*k* is maintained at LOW level due to inversion of the OR gate signal performed by the inverter 83*j*. Therefore, the AND gate 83*k* is maintained non-conductive despite HIGH level comparator signal of the comparator 83*a*.

Upon expiration of the $T_3$ period, the OR gate signal of the OR gate 83*g* turns into LOW level at a time $t_2$, as shown in FIG. 19(*e*). Then, both inputs to the AND gate 83*k* become HIGH to make the gate conductive to turn the gate signal $S_2$ thereof into HIGH level. In response to the HIGH level gate signal $S_2$ of the AND gate 83*k*, the analog switch 83*m* is turned ON to connect the acceleration reference signal generator 83*p* to the integrator circuit 87*o*. At this time, since the anti-skid brake control is not active and thus the MR signal is maintained at LOW level, the acceleration reference signal generator 83*p* stays at an initial position to select the negative voltage corresponding to +0.4 G. As a result, the integrator circuit integrates the input voltage E therefrom. It should be noted that assuming the retriggerable timer 30 is not activated to maintain the MR signal at LOW level, the internal switch of the acceleration reference signal generator circuit 83*p* selects 0.4 G as the input signal voltage E. Therefore, the projected vehicular speed representative data Vi increases as increasing of the integrated value Ve in a rate corresponding to 0.4 G. Therefore, the gradient of increasing of the projected vehicular speed representative data Vi becomes the value corresponding to 0.4 G, as shown in FIG. 19(*a*).

On the other hand, while the anti-skid brake control is performed and thus the MR signal is maintained at HIGH level, the acceleration reference signal generator circuit 83*p* selects the greater acceleration reference signal value, i.e. 10 G, so that the projected vehicular speed representative data Vi can be increased at greater rate than that in the condition where anti-skid control is not performed, for quicker approach to the common wheel speed representative data Vw.

As will be appreciated, by inputting the input voltage E having value 0.4 G or 10 G from the acceleration reference signal generator circuit 83*p*, the integrated value Ve of the integrator circuit 87*o* increases. With the increasing of the integrated value Ve, the projected vehicular speed representative value Vi increases. Accordingly, the upper deadband reference signal value Vi+ (Vi+1.0 (km/h)) increases across the common wheel speed representative data Vw, at a time $t_3$. As a result, the comparator signal $C_1$ of the comparator 83*a* turns into LOW level to turn the gate signal of the NOR gate 83*e* into HIGH level. In response to the HIGH level gate signal of the NOR gate 83*e*, the one-shot pulse generator circuit 84*h* produces the shot pulse to reset the sample/hold circuit 87*t* to hold the instantaneous common wheel speed representative data Vw as the sampled value Vs. Therefore, at the time $t_3$, the sampled value Vs becomes the instantaneous value of the common wheel speed representative data Vw. At the same time, the integrated value Ve of the integrator circuit 87*o* is cleared. Similarly to the process set forth with respect to the period $t_0$ to $t_3$, the projected vehicular speed representative data Vi is maintained at a value corresponding to the sampled value Vs until the given period $T_3$ of the timer 83*f* expires. Therefore, the integrated value Ve starts to increase the projected vehicular speed representative data Vi toward the common wheel speed representative data Vw after expiration of the aforementioned $T_3$ period. During this period, since the vehicle is maintained at accelerating condition, the common wheel speed representative data Vw reaches or becomes greater than the deadband reference signal Vi+ to cause HIGH level comparator signal C1 at a time $t_4$.

During the after expiration of $T_3$ period a time $t_5$, the gate signal level $S_5$ of the OR gate 83*g* turns into LOW level. As a result, the analog switch 83*i* is switched OFF and the analog switch 83*m* is turned ON. Therefore, the projected vehicle speed representative data Vi is again increased in a ratio of +0.4 g. Again, at a time $t_6$, the common wheel speed representative data Vw reaches the upper deadband reference signal value Vi+ to turn the output level of the comparator 83*a* LOW level. By this, the integrator 83*o* is reset. At the same time, the sample/hold circuit 83*t* holds the instantaneous value of the common wheel speed representative data Vw as the sampled value Vs. The process of the period between the time $t_5$ to $t_6$ and between the time $t_6$ to $t_7$ is repeated through the period between $t_7$ to $t_{14}$. The common wheel speed representative data Vw fluctuates across the upper and lower deadband reference signal values Vi+ and Vi− at a frequency to have an interval shorter than the $T_3$ period as seen from FIG. 10. According to variation of the common wheel speed representative data Vw across the upper deadband reference signal value Vi+, the comparator signal of the comparator 83*a* is turned into HIGH level.

It is assumed that the vehicular brake is applied to for deceleration at a time $t_{15}$. In response to application of brake, the common wheel speed representative data Vw decreases across the lower deadband reference signal value Vi−.

At the time $t_{15}$, the common wheel speed representative data Vw from the select-HIGH switch 81 decreases across the lower deadband reference signal value $V_i-$. In response to this, the comparator signal $C_2$ of the comparator 83b turns into HIGH level. By the HIGH level comparator signal $C_2$ of the comparator 83b, the gate signal level of the NOR gate 83e turns LOW. Similarly to the above, the off-delay timer 83f is triggered by the trailing edge of the HIGH level gate signal of the NOR gate 83e to output HIGH level signal for the period $T_3$. Therefore, the gate signal of the OR gate 83g is maintained for the $T_3$ period in spite of the presence of HIGH level comparator signal of the comparator 83b. At a time $t_{16}$, the $T_3$ period expires and the common wheel speed representative data Vw is held smaller than the lower deadband reference signal value $V_i-$, the gate signal of the OR gate 83g turns into LOW level to cause switching of the analog switch 83n from conductive state to non-conductive state. Simultaneously, the AND gate 83l becomes conductive to turn the analog switch 83n ON. As a result, the correction circuit 82 is connected to the integrator circuit 83o to input the deceleration reference signal $X_{GC}$ ($-m'$) which represents the deceleration gradient modified to maintain the value within the upper and lower limit values, to the latter as the input voltage E. Therefore, the integrated value Ve decreases at a rate corresponding to the gradient defined by the deceleration reference signal value $X_{GC}$. Accordingly, the projected vehicular speed representative value Vi decreases at the corresponding rate.

At a time $t_{17}$, the common wheel speed representative data Vw increases across the lower deadband reference signal value $V_i-$. Therefore, the comparator signal $C_2$ of the comparator 83b turns into LOW level. By this, the NOR condition of the NOR gate 83e is established to cause HIGH level gate signal of the latter. The one-shot pulse generator circuit 83h is responsive to the leading edge of the HIGH level gate signal of the NOR gate 83e to generate the shot pulse. By this shot pulse, the integrator circuit 83o is reset to clear the integrated value Ve. At the same time, the sample/hold circuit 83t is reset to update the sampled value Vs with the instantaneous common wheel speed representative data Vw.

In the period between the time $t_{17}$ and $t_{18}$, though the common wheel speed representative data Vw fluctuates across the upper and lower deadband reference signal values $V_i+$ and $V_i-$. However, similarly to that in the period $t_{14}$ to $t_{15}$ set forth above, because of higher frequency than that defined by the $T_3$ period of the timer 83f, the integrated value Ve is maintained zero. After the time $t_{18}$, the common wheel speed representative data Vw decreases across the lower deadband reference signal value $V_i-$. Therefore, the similar operation to that discussed with respect to the period $t_{15}$ to $t_{17}$ is performed.

Figure 20:
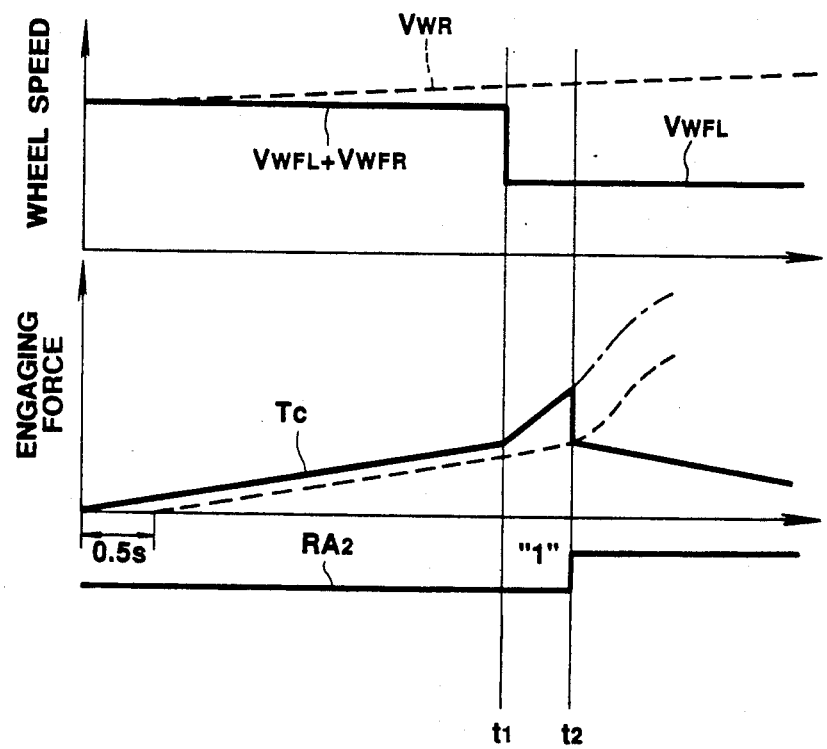
FIG. 20 is a timing chart showing operation of the driving torque distribution control channel in the preferred embodiment of the automotive activity control system of the invention.

Assuming that failure is caused in the wheel speed sensor 21FR, the faulty wheel speed sensor detector circuit 63FR outputs HIGH level faulty wheel speed sensor indicative signal $RA_2$. This causes increasing of the difference signal value $\Delta Vw$ derived at the step 1106 of the routine of FIG. 16, as shown in FIG. 20(a). In response to this, the engaging force $T_M$ to be derived in the step 1112 of the routine of FIG. 16, increases as illustrated by the solid line in FIG. 20(b) unless fail-safe operation is taking place. In contrast to this, according to the preferred process, when the failure of the wheel speed sensor 21FR is detected at a time $t_{21}$ by the faulty wheel speed sensor detector circuit 63FR. The faulty wheel speed sensor detector circuit 63FR outputs the faulty wheel speed sensor indicative signal $RA_2$ at a time $t_{22}$ after the predetermined period, e.g. 0.5 sec. from detection of failure as shown in FIG. 20(c). Then, presence of the faulty wheel speed sensor indicative signal $RA_2$ is detected by the microprocessor 74 at the step 1008 of the routine of FIG. 15. As a result, the fault indicative flag $AB_1$ is set at the step 1030 and the alarm ALT for alarming failure of the common element for both of the anti-skid brake control and the driving torque distribution control is generated at the step 1032. Then, the actuator relay 52 is shut down by the LOW level relay control signal $CR_2$ at the step 1034 and alarm $AL_4$ is generated at the step 1036 for alarming failure of the anti-skid control.

On the other hand, set condition of the fault indicative $AB_1$ is detected at the step 1114, the fail-safe operation for reducing the clutch control command value Tc to zero through the process of the steps 1134 through 1142. Therefore, after the time $t_{22}$, the clutch control command value Tc is gradually increased toward zero. As a result, moderate transition from four wheel drive mode to two wheel drive mode can be established.

As can be appreciated herefrom, the shown embodiment of the fail-safe operation can perform appropriate fail-safe operations depending upon the component of the control system in which failure is detected. Namely, in the shown embodiment, when the faulty component is common to both of the anti-skid brake control and the driving torque distribution control, fail-safe operations are ordered for both control channels. On the other hand, if the faulty component is used only for one of the anti-skid brake control channel or the driving torque distribution control channel, fail-safe operation is order only for one of the control channel including the faulty component.

Such process set forth above is successful in avoiding interference of the fail-safe operation in one control channel to the control operation in the other control channel.

Therefore, the present invention fulfills all of the objects and advantages sought therefor.

While the present invention has been disclosed in terms of the preferred embodiment in order to facilitate better understanding of the invention, it should be appreciated that the invention can be embodied in various ways without departing from the principle of the invention. Therefore, the invention should be understood to include all possible embodiments and modifications to the shown embodiments which can be embodied without departing from the principle of the invention set out in the appended claims.

For example, though the shown embodiment is applied for the automotive vehicle having selective four wheel drive mode and rear wheel drive power train layout, the invention is, of course application for the vehicle having selective four wheel drive and front wheel drive power train layout. Also, though the shown embodiment employs wet-type clutch assembly in the transfer unit, the electromagnetic clutch may also be used for switching power train mode. Furthermore, though the shown embodiment employs the electric motor for driving the oil pump serving as the pressure source, it may be possible to use other type of power source, such as engine. Also, the pressure control valve for controlling the engaging force of the clutch assembly of the transfer unit may be replaced with a pressure reduction valve or relief valve for adjusting the engaging force.

On the other hand, though the specific type of anti-skid brake control system has been discussed hereabove, the shown embodiment should not be limited the application to the specific arrangement of the anti-skid brake control system but is applicable for any of anti-skid brake control systems. For example, process of derivation of the wheel speed indicative analog data and the wheel acceleration indicative data, and process of anti-skid brake control have been disclosed in the following United States Patents, all owned by the common assignee to the present invention.

U.S. Pat. No. 4,408,290, issued on Oct. 4, 1983
U.S. Pat. No. 4,674,049, issued on Jun. 16, 1987
U.S. Pat. No. 4,704,684, issued on Nov. 3, 1987
U.S. Pat. No. 4,663,715, issued on May 5, 1987
U.S. Pat. No. 4,663,716, issued on May 5, 1987
U.S. Pat. No. 4,660,146, issued on Apr. 21, 1987
U.S. Pat. No. 4,665,491, issued on May 12, 1987
U.S. Pat. No. 4,780,818, issued on Oct. 25, 1988
U.S. Pat. No. 4,674,050, issued on Jun. 16, 1987
U.S. Pat. No. 4,680,714, issued on Jul. 14, 1987
U.S. Pat. No. 4,682,295, issued on Jul. 21, 1987
U.S. Pat. No. 4,680,713, issued on Jul. 14, 1987
U.S. Pat. No. 4,669,046, issued on May 26, 1987
U.S. Pat. No. 4,669,045, issued on May 26, 1987
U.S. Pat. No. 4,679,146, issued on Jul. 7, 1987
U.S. Pat. No. 4,656,588, issued on Apr. 7, 1987
U.S. Pat. No. 4,718,013, issued on Jan. 5, 1988
U.S. Pat. No. 4,569,560, issued on Feb. 11, 1986
U.S. Pat. No. 4,662,686, issued on May 5, 1987
U.S. Pat. No. 4,667,176, issued on May 19, 1987
U.S. Pat. No. 4,597,052, issued on Jun. 24, 1986
U.S. Pat. No. 4,637,663, issued on Jan. 20, 1987
U.S. Pat. No. 4,683,537, issued on Jul. 28, 1987

The disclosure of the above-identified United States Patents will be herein incorporated by reference for the sake of disclosure.

What is claimed is:

1. A fail-safe system for a multiple task control system for performing mutually different first and second control tasks, said multiple task control system performing said first control task on the basis of a first parameter monitored by first monitoring means and a second parameter monitored by second monitoring means and performing said second control task on the basis of said first parameter common to said first task and a third parameter monitored by third monitoring means, said fail-safe system comprising:

first malfunction detecting means for monitoring operation of said first monitoring means to detect a faulty condition of said first monitoring means and for producing a first failure detecting signal which is indicative of failure of both of said first and second control tasks;

second malfunction detecting means for monitoring said second and third monitoring means to detect a faulty condition of one of said second and third monitoring means and for producing a second failure detecting signal which indicates failure of one of said second and third monitoring means for which said failure is detected; and controlling means for normally performing said first and second control tasks independent of each other on the basis of said first, second and third parameters, said controlling means being responsive to said first failure detecting signal to perform a first mode fail-safe operation in both of first and second control operations and for performing said first and second tasks, and to said second failure detecting signal to perform a second mode fail-safe operation in one of said first and second control operations utilizing a faulty one of said second and third monitoring means as indicated by said second failure indicative signal.

2. A fail-safe system as set forth in claim 1, wherein said second malfunction detecting means includes a first detector associated with said second monitoring means for continuously monitoring an output thereof for detecting a first abnormality and for producing a first abnormality detecting signal indicative of failure of said second monitoring means, and a second detector continuously monitoring an output thereof for detecting a second abnormality and for producing a second abnormality detecting signal indicative of failure of said third monitoring means.

3. A fail-safe system as set forth in claim 1, wherein said multiple task control system includes a first control channel including a first actuator for performing said first control task and a second control channel including a second actuator for performing said second control task, and said second malfunction detecting means includes a third detector constantly monitoring a first control command to be applied to said first actuator and operation of said first actuator for detecting abnormality in said first actuator operation in terms of said first control command to produce a third abnormality detecting signal indicative of failure of said first actuator, and a second control channel including a second actuator for performing said second control task, and said second malfunction detecting means includes a third detector constantly monitoring a second control command to be applied to said second actuator and operation of said second actuator, for detecting abnormality in said second actuator operation in terms of said second control command to produce a fourth abnormality detecting signal indicative of failure of said second actuator.

4. A fail-safe system as set forth in claim 3, wherein said controlling means is responsive to said second failure detecting signal of said second monitoring means for shutting off power supply for one of said first and second actuators in one of said first and second control channels in which failure of a monitoring means or an actuator is detected.

5. A fail-safe system as set forth in claim 4, wherein said first and second actuators are responsive to shutting down of power supply to be placed at predetermined operational positions.

6. A fail-safe system as set forth in claim 3, which further comprises a first alarm to be triggered in response to said first failure detecting signal for alarming said first mode fail-safe operation common to said first and second control channels and a second alarm to be triggered in response to said second failure detecting signal for alarming said second mode fail-safe operation for one of said first and second control channels in which failure of a monitoring means or an actuator is detected.

7. A fail-safe system as set forth in claim 4, wherein said controlling means is responsive to said first failure detecting signal to perform said first mode fail-safe operation for said second monitoring means, in which said control command to be applied to said second actuator in said second control channel is modified periodically by a given rate toward a predetermined value for a predetermined position of said second actuator.

8. A multi-task control system, comprising:
a first control channel for controlling operation of a first control load, said first control channel including first monitoring means for monitoring a first control parameter and for providing first parameter data and second monitoring means for monitoring a second control parameter different from said first control parameter, and for providing second parameter data, and said first control channel further including first signal processing means for processing said first and second control parameter data and for deriving a first command value indicative of an operational magnitude of said first control load;

a second control channel for controlling operation of a second load, said second control channel including said first monitoring means which is common to said first control channel and third monitoring means for monitoring a third control parameter different from said first control parameter, and for providing third parameter data, and said second control channel further including second signal processing means for processing said first and third control parameter data and for deriving a second command value indicative of an operational magnitude of said second control load;

first malfunction detecting means monitoring said first parameter data provided from said first monitoring means in order to detect abnormality of said first parameter data and produce a first failure detecting signal;

second malfunction detecting means monitoring said second parameter data provided from said second monitoring means in order to detect abnormality of said second parameter data and produce a second failure detecting signal;

third malfunction detecting means monitoring said third parameter data provided from said third monitoring means in order to detect abnormality of said third parameter data and produce a third failure detecting signal;

first fail-safe means responsive to said first failure detecting signal for performing first mode fail-safe operation, in which fail-safe operation is commonly commanded for both of said first and second control channels for predetermined first mode fail-safe operations in each of said first and second control channels; and second fail-safe means responsive to one of said second and third failure detecting signals, for performing second mode fail-safe operation, in which fail-safe operation is selectively commanded to one of said first and second control channels corresponding to an input failure detecting signal for a predetermined second mode fail-safe operation therein.

9. A multi-task control system as set forth in claim 8, wherein said first control channel includes a first actuator for operating said first control load and said second control channel includes a second actuator for operating said second control load, and said second malfunction detecting means includes a fourth malfunction detecting means constantly monitoring a first control command to be applied to said first actuator and operation of said first actuator so as to detect abnormal operation of said first actuator in terms of first control command to produce a fourth failure detecting signal indicative of failure of said first actuator, and said second malfunction detecting means includes a fifth malfunction detecting means constantly monitoring a second control command to be applied to said second actuator and operation of said second actuator so as to detect abnormal operation of said second actuator in terms of said second control command to produce a fifth failure detecting signal indicative of failure of said second actuator.

10. A multi-task control system as set forth in claim 9, wherein said first fail-safe means is responsive to said first failure detecting signal from said first malfunction detecting means for shutting off power supply for said first actuator in said first control channel, and said second fail-safe means is respsonsive to said second failure detecting signal from said second malfunction detecting means for shutting off power supply for said second actuator in said second control channel.

11. A multi-task control system as set forth in claim 10, wherein said first and second actuators are responsive to shutting down of power supply to be placed at predetermined operational positions.

12. A multi-task control system as set forth in claim 11, wherein said first fail-safe means includes a first alarm to be triggered in response to said first failure detecting signal for alarming said first mode fail-safe operation common to said first and second control channels and said second fail-safe means includes a second alarm to be triggered in response to said second failure detecting signal for alarming said second mode fail-safe operation in said first control channel.

13. A multi-task control system as set forth in claim 12, wherein said second fail-safe means is responsive to said first failure detecting signal to perform said first mode fail-safe operation for said second control channel, in which said second control command to be applied to said second actuator in said second control channel is modified periodically by a given rate toward a predetermined value for a predetermined position of said second actuator.

14. A multi-task control system for an automotive vehicle for controlling a first vehicular component associated with vehicular driving operation for adjusting first vehicular behavior and a second vehicular component associated with vehicular driving operation for adjusting second vehicular behavior, comprising:
a first control channel for controlling operation of a first vehicular component, said first control channel including first monitoring means for monitoring a first control parameter and for providing first parameter data and second monitoring means for monitoring a second control parameter different from said first control parameter and for providing second parameter data, and said first control channel further including first signal processing means for processing said first and second control parameter data and for deriving a first command value indicative of an operational magnitude of said first vehicular component;

a second control channel for controlling operation of a second vehicular component, said second control channel including said first monitoring means which is common to said first control channel and third monitoring means for monitoring a third control parameter different from said first control parameter and for providing third parameter data, and said second control channel further including second signal processing means for processing said first and third control parameter data and for deriving a second command value indicative of an operational magnitude of said second vehicular component;

first malfunction detecting means monitoring said first parameter data provided from said first monitoring means in order to detect abnormality of said first parameter data and produce a first failure detecting signal;

second malfunction detecting means monitoring said second parameter data provided from said second monitoring means in order to detect abnormality of said second parameter data and produce a second failure detecting signal;

third malfunction detecting means monitoring said third parameter data provided from said third monitoring means in order to detect abnormality of said third parameter data and produce a third failure detecting signal;

first fail-safe means responsive to said first failure detecting signal for performing first mode fail-safe operation, in which fail-safe operation is commonly commanded for both of said first and second control channels for predetermined first mode fail-safe operations in each of said first and second control channels; and second fail-safe means responsive to one of said second and third failure detecting signals, for performing second mode fail-safe operation, in which fail-safe operation is selectively commanded for one of said first and second control channels corresponding to an input failure detecting signal for a predetermined second mode fail-safe operation therein.

15. A multi-task control system as set forth in claim 14, wherein said first control channel includes a first actuator for operating said first vehicular component and said second control channel includes a second actuator for operating said second vehicular component, and said second malfunction detecting means includes a fourth malfunction detecting means constantly monitoring a first control command to be applied to said first actuator and operation of said first actuator so as to detect abnormal operation of said first actuator in terms of said first control command to produce a forth failure detecting signal indicative of failure of said first actuator, and said second malfunction detecting means includes a fifth malfunction detecting means constantly monitoring a second control command to be applied to said second actuator and operation of said second actuator so as to detect abnormal operation of said second actuator in terms of said second control command to produce a fifth failure detecting signal indicative of failure of said second actuator.

16. A multi-task control system as set forth in claim 15, wherein said first fail-safe means is responsive to said first failure detecting signal input from said first malfunction detecting means for shutting off power supply for said first actuator in said first control channel, and said second fail-safe means is responsive to said second failure detecting signal input from said second malfunction detecting means for shutting off power supply for said second actuator in said second control channel.

17. A multi-task control system as set forth in claim 16, wherein said first and second actuators are responsive to shutting down of power supply to be placed at predetermined operational positions.

18. A multi-task control system as set forth in claim 17, wherein said first fail-safe means includes a first alarm to be triggered in response to said first failure detecting signal for alarming said first mode fail-safe operation common to said first and second control channels and said second fail-safe means includes a second alarm to be triggered in response to said second failure detecting signal for alarming said second mode fail-safe operation in said first control channel.

19. A multi-task control system as set forth in clam 18, wherein said second fail-safe means is responsive to said first failure detecting signal to perform said first mode fail-safe operation for said second control channel, in which said second control command to be applied to said second actuator in said second control channel is modified periodically by a given rate toward a predetermined value for a predetermined position of said second actuator.

20. A multi-task control system for an automotive vehicle for performing anti-skid brake control for a vehicular brake system and power train control for adjusting distribution of driving torque generated by a prime mover to primary and subsidiary driving wheels, comprising:

a first control channel, associated with said vehicular brake system, for performing anti-skid brake control for optimizing vehicular braking performance, said first control channel processing preselected brake control parameters for deriving a magnitude of wheel acceleration and deceleration and wheel slippage for selecting an operational mode of said brake system for selectively increasing, decreasing and holding braking pressure in said brake system;

a second control channel, associated with said power train for adjusting power distribution between a primary driving wheel which is constantly connnected to said prime mover to receive driving torque and a subsidiary driving wheel, for which a controlled distrubution rate of driving torque of said prime mover is supplied, said second control channel processing preselected driving torque distribution control parameters which include at least one common parameter to said first control channel;

first malfunction detecting means mointoring said common parameter in order to detect abnormality thereof and produce a first failure detecting signal;

second malfunction detecting means mointoring second parameter data in said first control channel other than said common parameter in order to detect abnormality thereof and produce a second failure detecting signal;

third malfunction detecting means monitoring third parameter data in said second control channel other than said common parameter in order to detect abnormality thereof and produce a third failure detecting signal;

first fail-safe means responsive to said first failure detecting signal for performing first mode fail-safe operation, in which fail-safe operation is commonly commanded for both of said first and second control channels for perdetermined first mode fail-safe operations in each of said first and second control channels; and second fail-safe means responsive to one of said second and third failure detecting signals, for performing second mode fail-safe operation, in which fail-safe operation is selectively commanded for one of said first and second control channels corresponding to an inputted failure detecting signal for a predetermined second mode fail-safe operation therein.

21. A multi-task control system as set forth in claim, 20, wherein said first control channel includes a first actuator for adjusting braking pressure in said brake system and said second control channel includes a second actuator for adjusting torque distribution for said subsidiary driving wheel, and said second malfunction detecting means includes a fourth malfunction detecting means constantly monitoring a first control command to be applied to said first actuator and operation of said first actuator so as to detect abnormal operation of said first actuator in terms of said first control command to produce a fourth failure detecting signal indicative of failure of said first actuator, and said second malfunction detecting means includes a fifth malfunction detecting means constantly monitoring a second control command to be applied to said second actuator and operation of said second acutator so as to detect abnormal operation of said second actuator in terms of said second control command to produce a fifth failure detecting signal indicative of failure of said second actuator.

22. A multi-task control system as set forth in claim 21, wherein said first fail-safe means is responsive to said first failure detecting signal from said first malfunction detecting means for shutting off power supply for said first actuator in said first control channel, and said second fail-safe means is responsive to said second failure detecting signal input from said second malfunction detectng means for shutting off power supply for said second actuator in said second control channel.

23. A multi-task control system as set forth in claim 22, wherein said first and second acutators are responsive to shutting down of power supply to be placed at predetermined operational positions.

24. A multi-task control system as set forth in claim 23, wherein said first actuator operates said brake system for disabling, decreasing and holding braking pressure and permitting increasing of braking pressure in response to shutting down of power supply.

25. A multi-task control system as set forth in claim 23, wherein said second actuator is responsive to shutting down of power supply to block driving torque distribution for said subsidiary driving wheel.

26. A multi-task control system as set forth in claim 23, wherein said first fail-safe means includes a first alarm to be triggered in response to said first failure detecting signal for alarming said first mode fail-safe operation common to said first and second control channels and said second fail-safe means includes a second alarm to be triggered in response to said second failure detecting signal for alarming said second mode fail-safe operation in said first control channel.

27. A multi-task control system as set forth in claim 26, wherein said second fail-safe means is responsive to said failure detecting signal to perform said first mode fail-safe operation for said second control channel, in which said second control command to be applied to said second actuator in said second control channel is modified periodically by a given rate toward a predetermined value for a predetermined position of said second actuator.

* * * * *